United States Patent
Gaudry et al.

(10) Patent No.: US 9,554,579 B2
(45) Date of Patent: Jan. 31, 2017

(54) MOLDABLE SUBSTANCES AND STRIPS FOR MAKING BAKED ITEMS WITH DESIRED SPATIAL FEATURES

(76) Inventors: Katherine Sue Gaudry, Cambridge, MA (US); Quentin Gaudry, Cambridge, MA (US); Deborah Kay Denning, Hays, KS (US)

( * ) Notice: Subject to any disclaimer, the term of this patent is extended or adjusted under 35 U.S.C. 154(b) by 1069 days.

(21) Appl. No.: 12/413,509

(22) Filed: Mar. 27, 2009

(65) Prior Publication Data

US 2009/0181142 A1    Jul. 16, 2009

Related U.S. Application Data

(63) Continuation-in-part of application No. PCT/US2008/079765, filed on Oct. 14, 2008.

(60) Provisional application No. 61/029,839, filed on Feb. 19, 2008, provisional application No. 60/991,408, filed on Nov. 30, 2007, provisional application No. 60/980,392, filed on Oct. 16, 2007.

(51) Int. Cl.
  A21D 13/08   (2006.01)
  A21B 3/13    (2006.01)
  C11C 5/02    (2006.01)

(52) U.S. Cl.
  CPC .......... *A21B 3/13* (2013.01); *A21B 3/138* (2013.01); *A21D 13/08* (2013.01); *C11C 5/023* (2013.01)

(58) Field of Classification Search
  CPC ........... A21B 3/13; A21B 3/138; A21D 13/08; C11C 5/023
  USPC .......... 426/512, 513, 514, 515, 246, 279, 280,426/282, 389, 89, 94, 96, 98, 99, 274, 275; 249/155, DIG. 1
  See application file for complete search history.

(56) References Cited

U.S. PATENT DOCUMENTS

| | | | | |
|---|---|---|---|---|
| 2,004,810 A | * | 6/1935 | Hines | 29/11 |
| 2,027,296 A | * | 1/1936 | Stuart et al. | 206/524.6 |
| 2,775,523 A | * | 12/1956 | Green | 426/104 |
| 3,107,587 A | * | 10/1963 | Tipton | 493/51 |
| 3,128,725 A | * | 4/1964 | Becker et al. | 249/155 |
| 3,422,671 A | * | 1/1969 | Elengo, Jr. | 73/862.629 |
| 3,976,796 A | | 8/1976 | Peters | |
| 3,992,005 A | * | 11/1976 | Richey | 473/40 |
| 4,114,760 A | * | 9/1978 | Entenmann | 206/562 |
| 4,156,516 A | * | 5/1979 | Oliver | 249/53 R |
| 4,452,419 A | | 6/1984 | Saleeba | |
| 4,778,687 A | * | 10/1988 | Kikuchi | 426/412 |
| 5,009,905 A | * | 4/1991 | Ikeda | 426/297 |
| 5,240,342 A | * | 8/1993 | Kresa, Jr. | 403/232.1 |
| 5,453,287 A | * | 9/1995 | Close | 426/512 |

(Continued)

FOREIGN PATENT DOCUMENTS

CH    598080 A  *  4/1978
EP    856256 A1 *  8/1998

(Continued)

OTHER PUBLICATIONS

"Make and Mold a Polymer Clay Face", published Mar. 8, 2007, http://web.archive.org/web/20070308065811/http://www.polyclay.com/make_a_mold1.htm.*

(Continued)

*Primary Examiner* — Viren Thakur

(57) ABSTRACT

Methods and systems provided herein relate to forming an item with desired spatial features. The item may be a food item, such as a baked item or a cake. The desired spatial features may include two-dimensional shapes and/or three-dimensional features. The item may be formed into the desired shape by forming a moldable substance and/or flexible strips.

7 Claims, 9 Drawing Sheets

(56) References Cited

U.S. PATENT DOCUMENTS

| | | | |
|---|---|---|---|
| 5,709,155 A * | 1/1998 | Terracciano | 108/42 |
| 5,765,470 A * | 6/1998 | Sitro | 99/432 |
| 5,989,616 A * | 11/1999 | Bouton-Hughes | 426/496 |
| 6,878,199 B2 | 4/2005 | Bowden | |
| 7,083,673 B2 | 8/2006 | Bowden | |
| 2003/0216492 A1 | 11/2003 | Bowden | |
| 2004/0216807 A1* | 11/2004 | Blessman | 141/390 |
| 2005/0013951 A1 | 1/2005 | Mitchell | |
| 2005/0120915 A1 | 6/2005 | Bowden | |
| 2006/0027104 A1* | 2/2006 | Perez, Jr. | 99/426 |
| 2006/0255507 A1 | 11/2006 | Bowden | |
| 2007/0029703 A1 | 2/2007 | Perez | |
| 2008/0313990 A1* | 12/2008 | Cretti | 52/414 |

FOREIGN PATENT DOCUMENTS

| | | | | |
|---|---|---|---|---|
| FR | 2661158 | A | * | 10/1991 |
| JP | 62257349 | A | * | 11/1987 |
| JP | 07126586 | A | * | 5/1995 |
| WO | WO 9802045 | A1 | * | 1/1998 |
| WO | WO 2006066349 | A1 | * | 6/2006 |

OTHER PUBLICATIONS

"Silicone Plastique", Published Feb. 21, 2007 http://web.archive.org/web/20070221072953/http://www.culinart.net/silicone.html.*

"Silicone Bakeware" published Feb. 14, 2007 http://web.archive.org/web/20070214083054/http://www.bakedeco.com/static/list/flexible-silicone-bakeware.htm.*

Culinart. published Dec. 7, 2004 http://web.archive.org/web/20041207204510/www.culinart.net/silicone.html.*

"Wooden Hinges" published Jun. 30, 2007 http://web.archive.org/web/20070630012830/http://www.woodgears.ca/wood_hardware/hinges.html.*

Webster's New World Dictionary, 1988, Simon & Schuster.*

"Amazing Mold Putty." May 5, 2007, http://web.archive.org/web/20070505060307/http://www.amazingmoldputty.com/.* de Bretagne, Rachelle. "Understanding wood expansion and shrinking." Jul. 2, 2007 http://www.helium.com/items/433164-understanding-wood-expansion-and-shrinking.*

"Adobo Chicken" published Jun. 18, 1997 http://groups.google.com/group/rec.food.cooking/browse_thread/thread/eca56412cd3013fc/73cb12c8847e7a42?hl=en&q=What+is+adobo+chicken.*

"Rhubarb Marzipan Tarts." published Mar. 26, 2003 http://groups.google.com/group/alt.food.vegan/browse_thread/thread/fad506c0a8a21bb8/94e98b00d5f9d8ea?.*

Formal Translation of JP 62-257349 to Tsunoda Nov. 1987.*

Definition of "wrap" dictionary.com, Dec. 19, 2012.*

"Cincinnati Celiac Support Group." Aug. 31, 2006 http://groups.google.com/group/cinciceliac/browse_thread/thread/78f623e4d8ff00d9/77f68ea9687d9ec6?hl=en&q=bad+tasting+pie+crust.*

"The Epicurean Table" Jan. 18, 2006 http://web.archive.org/web/20060118045456/http://www.epicureantable.com/tutfrcake.htm.*

"English Patis—Beggar's Chicken" Mar. 16, 2005 http://desarapen.blogspot.com/2004/12/beggars-chicken.html.*

"The Cook and The Chef" Jun. 16, 2006 http://www.abc.net.au/tv/cookandchef/txt/s1635138.htm.*

Schloss, Andrew. "Cooking with Clay" Mar. 9, 1988 http://articles.philly.com/1988-03-09/food/26275987_1_clay-cookware-clay-pot-hot-pot.*

Definition of "inside." Webster's New World Dictionary, $3^{rd}$ College Edition, Simon & Schuster 1988.*

"Honey Roasted Guinea Hen" Mar. 24, 2006 http://web.archive.org/web/20060324201144/http://melindalee.com/recipearchive.html?action=124&item_id=638.*

"Greasing abd Flouring Cake Pans." Jul. 24, 2006 http://chowhound.chow.com/topics/311902.*

"LeKue" 2005 http://www.realbakingwithrose.com/images/lekue_booklet.pdf.*

JT Products "Magi-Cake Strips", accessed Oct. 11, 2008, at http://www.magi-cake.com/html/product.html, published since 2001 according to InternetArchives, p. 1-2.

Allrecipes, "Peanut Butter Playdough", accessed Oct. 11, 2008, comment posts dating from 2004, at http://allrecipes.com/Recipe/Peanut-Butter-Playdough/Detail.aspx, p. 1-2.

International Bureau, International Preliminary Report on Patentability for PCT/US2008/079765, Apr. 29, 2010, pp. 1-6.

International Searching Authority Written Opinion of the International Searching Authority for PCT/US2008/079765, Apr. 15, 2009, pp. 1-5.

* cited by examiner

MOLDABLE SUBSTANCES AND STRIPS FOR MAKING BAKED ITEMS WITH DESIRED SPATIAL FEATURES

CROSS-REFERENCE TO RELATED APPLICATIONS

This application is a continuation-in-part of PCT/US 08/79765, filed on Oct. 14, 2008, which claims priority to U.S. Provisional Patent Application No. 61/029,839, filed on Feb. 19, 2008; U.S. Provisional Patent Application No. 60/991,408, filed on Nov. 30, 2007; and U.S. Provisional Patent Application No. 60/980,392, filed on Oct. 16, 2007, each of which is hereby incorporated by reference in its entirety.

BACKGROUND OF THE INVENTION

Field of the Invention

Methods and systems provided herein relate to forming an item with desired spatial features. The item may be a food item, such as a baked item or a cake. The desired spatial features may include unusual two-dimensional shapes and/or three-dimensional features. The item may be formed into the desired shape by forming a moldable substance and/or a flexible strip.

Description of the Related Art

A variety of baked goods are made by pouring a batter into a baking pan and baking the pan and the batter. Typically, the baked item will then be characterized with a shape that is substantially similar to a shape of the baking pan. For example, 13×9-inch rectangular pans or 9-inch circular pans can be used to produce cakes with corresponding dimensions.

In some instances, it may be desirable to produce a baked item of a nonstandard shape. It may also be desirable to produce a three-dimensional baked item, such that one feature of the cake "pops out" compared to others. One approach for producing a baked item with a nonstandard two- or three-dimensional feature includes producing a large baked item and subsequently removing sections of the large item to form the desired shape. However, it may be difficult to visualize the results of the removal steps, and mistakes during the removal step may be difficult or impossible to repair. Additionally, cutting the baked item often produces a great number of crumbs, making subsequent frosting or icing steps more difficult. Further, a substantial fraction of the baked item may be wasted in this process.

Another approach includes producing a plurality of baked items and combining (e.g., stacking) them to produce the desired shape. This approach is limited based on the sizes of the plurality of baked items, and may also require removing sections of the plurality of baked items, which is subject to disadvantages described above. Further, combining the plurality of baked items may rely upon frosting and/or wooden supports to keep the baked items together. Improper support may cause the plurality of baked items to separate, crumble or break.

Yet another approach for producing a baked item with a nonstandard feature includes using a pan that incorporates the feature. For example, a cake may be baked within a heart-shaped pan. However, a separate pan may then need to be purchased for each desired shape. This adds expense to the baking process. It may also be inconvenient to store the pans, especially pans required to produce large cakes. Further, there may not be a pan available with the desired spatial characteristics.

SUMMARY OF THE INVENTION

In some embodiments, a method for baking a baked item is provided, the method comprising: positioning a flexible strip on a surface along at least part of desired shape; positioning an initial food item next to the strip, said strip at least partially containing said initial food item within the desired shape; baking the initial food item and the strip; and separating the baked food item from the baked strip, wherein the resulting baked food item comprises a shape substantially similar to the desired shape, wherein the strip comprises a plurality of vertical supports, wherein each support is characterized by a length, width and depth, the length being at least about four times the width and at least about four times the depth, and wherein the vertical supports are configured such that their relative positions with respect to each other is not fixed. The strip may further comprise an outside layer, which is connected to, at least partly surrounds, encases, or at least partly covers the vertical supports. The outside layer may be malleable, and/or its shape may be substantially controlled by the relative positions of the supports. The flexible strip may be provided in a closed shape. The length of the vertical supports may be at least about two cm. Adjacent supports may be connected by a floppy connector. Adjacent supports may be separated by a distance less than about one cm. The strip may comprise at least about 20 vertical supports. The average density of supports per unit length of the strip may be about 3 vertical supports per inch. The strip may be configured such that it may be formed along substantially any two-dimensional shape. The method may further comprise providing a drawing; and positioning the strip along one or more lines of the drawing, wherein said resulting baked item comprises a shape substantially similar to a shape of the drawing. The initial food item may comprise a cake batter.

In some embodiments, a method for baking a baked item is provided, including molding a moldable substance into a desired shape; positioning an initial food item at a selected location relative to the moldable substance; and baking the initial food item and the moldable substance, wherein the resulting baked food item comprises a shape substantially similar to the desired shape or substantially complementary to the desired shape. The method may further include separating the baked food item from the baked moldable substance, positioning the moldable substance in a baking pan, removing the baked moldable substance from a baking pan, and/or coating at least a portion of the moldable substance with a coloring substance. The moldable substance may be edible. The method may further include combining an initial component with one or more ingredients to form the moldable substance. The one or more additional ingredients may include a liquid ingredient. The moldable substance may be configured to be moldable at substantially room temperature and/or to maintain a molded shape upon exposure to temperatures between about 150° F. and about 500° F. The moldable substance may comprise a hydrophobic substance, such as an oleaginous material, and/or a material selected from the group consisting of cocoa butter, a nut butter, milk fat, vegetable oil, canola oil, corn oil, a nut oil, soybean oil, hydrogenated vegetable oil, partially hydrogenated vegetable oil and mixtures thereof. The moldable substance may include one or more of water, a salt, a lubricant, a surfactant, a starch-based binder, a preservative, a hardener, a retrogradation inhibitor, a humectant, a fragrance and a colorant. The moldable substance may include sugar. The baked food item may include one or more of a cake, bar cookies, brownies, cupcakes, cookies, a pie, muffins and a bread. The method may further include coating the moldable substance with an ingredient. The molding step may include forming walls that define the desired shape with the moldable substance, and wherein the positioning step comprises positioning the initial food item inside the walls and/or forming an indentation of the desired shape in the moldable substance, and wherein the positioning step comprises positioning the initial food item over the moldable substance. The positioning the initial food item may comprise positioning the food item on the moldable substance. The separating the baked food item from the baked moldable substance may include inverting a baking container, wherein the baked food item is substantially removed from the baking container as a result of the inversion, and wherein the baked moldable substance remains substantially in the baking container following the inversion. The method may further comprise cutting the baked moldable substance to separate the baked moldable substance into a plurality of pieces and may include separating the plurality of pieces from the baked food item. The moldable substance may include hydrogenated or partially hydrogenated oil and a sugar in a ratio of the volume of the hydrogenated or partially hydrogenated oil over the volume of the sugar between about 1 to about 8.

In some embodiments, a method is provided including distributing a component configured to be a moldable substance; and instructing that a batter may be positioned at a selected location relative to the moldable substance. The instructing step may include one or both of instructing that that the batter may be poured onto the location and instructing that the batter may be spread onto the location. The location may include a location over the moldable substance and/or a location adjacent to the moldable substance. The method may further include instructing that the moldable substance may be separated from the batter subsequent to baking of the moldable substance and the batter. The moldable substance may be edible. The instructing step may include providing a label with instructions that the batter may be positioned at a location relative to the moldable substance.

In some embodiments, a method is provided including distributing a component configured to be a moldable substance; and concomitantly instructing that: the moldable substance may be formed into a desired shape, the moldable substance may be positioned inside a baking pan or baking sheet, a batter may be positioned within the formed shape, and the batter and the formed moldable substance may be baked. The component may include a hydrogenated vegetable oil, a sugar, a nut butter, and/or a flavoring. The information may be provided via a readable medium.

In some embodiments, a package is provided including a component configured to be a moldable substance; and instructions and/or a label, wherein the instructions and/or label indicate that a shape of the moldable substance may at least partially determine the shape of a food item. The component may be a moldable substance and/or may be configured to form a moldable substance upon being combined with one or more additional ingredients, such as a liquid ingredient. The instructions and/or label may indicate that a shape of the moldable substance may at least partially determine the shape of a food item baked adjacent to the moldable substance. The moldable substance may be configured to be moldable at substantially room temperature, to maintain a molded shape upon exposure to temperatures between about 150° F. and about 500° F. and/or to be substantially separatable from a food item subsequent to the baking of the food item adjacent to the moldable substance. The moldable substance may be edible. The component may include a hydrophobic substance.

In some embodiments, a method for baking a cake is provided, including positioning a moldable substance on the bottom of a baking pan; molding the moldable substance into a desired shape; positioning a cake batter on the moldable substance; baking the moldable substance and the cake batter at a temperature between about 150° F. and about 500° F. for a time between about 8 minutes and about 70 minutes; inverting the baking pan, thereby separating the baked moldable substance from the baked cake batter; and removing the baked moldable substance from the baking pan, wherein the baked cake batter comprises a shape substantially similar to the desired shape or substantially complementary to the desired shape, wherein the moldable substance comprises a hydrogenated or partially hydrogenated oil, wherein the moldable substance comprises a sugar, and wherein the moldable substance is edible. The moldable substance may be formed by combining the hydrogenated or partially hydrogenated oil and the sugar in a ratio of volume of the hydrogenated or partially hydrogenated oil over the volume of the sugar between about 1 to about 8, between about 2 and about 6, or between about 3 and about 5. The sugar may include powdered sugar and the hydrogenated or partially hydrogenated oil may include shortening. The moldable substance may be formed by combining a non-hydrogenated oil with the hydrogenated or partially hydrogenated oil and the sugar.

In some embodiments, a method for baking a cake is provided, including positioning a moldable substance on the bottom of a baking pan; molding the moldable substance into a desired shape; positioning a cake batter inside the desired shape formed by the moldable substance; baking the moldable substance and the cake batter at a temperature between about 150° F. and about 500° F. for a time between about 8 minutes and about 70 minutes; cutting the baked moldable substance to separate the baked moldable substance into a plurality of pieces; and separating the plurality of pieces from the baked cake batter; wherein the baked cake batter comprises a shape substantially similar to the desired shape or substantially complementary to the desired shape, wherein the moldable substance comprises a hydrogenated or partially hydrogenated oil, wherein the moldable substance comprises a sugar, and wherein the moldable substance is edible. The moldable substance may be formed by combining the hydrogenated or partially hydrogenated oil and the sugar in a ratio of the volume of the hydrogenated or partially hydrogenated oil to the volume of the sugar in the range of about 1 to about 8, about 2 to about 6, or about 3 to about 5. The sugar may include powdered sugar and the hydrogenated or partially hydrogenated oil may include shortening. The moldable substance may be formed by combining a non-hydrogenated oil with the hydrogenated or partially hydrogenated oil and the sugar.

In some embodiments, a method for decorating a baked food item is provided, the method including using a mold to form a moldable, edible substance into a desired decorating shape; and positioning the substance on a baked food item, wherein the moldable substance is configured to be molded into a desired shape, positioned at a location relative to a cake batter, baked with the cake batter, and separated from the baked cake, having imparted a shape substantially similar to or substantially complementary to the desired shape onto the resulting cake. The baked food item may include a cake. The mold may include plastic. The mold may include a single sheet with one or more indentations and/or two sheets, wherein at least one of the sheets comprises one or more indentations. The two sheets may be connected together and/or connected by a hinge. The moldable, edible substance may include one or more partially or fully hydrogenated fats, wherein the one or more fats are between about 25% and about 40% of the total weight of the moldable substance. The moldable, edible substance may include one or more oleaginous materials, wherein the oleaginous materials are between about 25% and about 40% of the total weight of the moldable substance. The moldable, edible substance may include one or more oleaginous materials, wherein an amount of the oleaginous materials in the moldable, edible substance is sufficient to enable the substance to be placed directly adjacent to a cake batter and baked and to be easily separatable from the baked cake. The moldable, edible substance may include an ingredient with a density less than about 120 g/cup, wherein an amount of the ingredient in the moldable, edible substance is sufficient to prevent the substance from sticking to a plastic surface. The ingredient may include more than about 20% of the total weight of the moldable, edible substance. The ingredient may include or may consist of powdered sugar. In some embodiments, the moldable, edible substance does not include more than about 1% of a non-oleaginous liquid ingredient and/or of a liquid ingredient. In some embodiments, the amount of one or more oleaginous liquid ingredients, one or more non-oleaginous liquid ingredients, or one or more liquid ingredients in a moldable substance is sufficient to enable the moldable substance to be molded into a plurality of shapes without substantially crumbling.

In some embodiments, a method for decorating a baked food item is provided, the method including loading a moldable, edible substance into an extruder; pressing a component, thereby inducing pressure on the moldable, edible substance; extruding the moldable, edible substance through a hole on the extruder, wherein the extruded substance comprises a desired spatial feature; and positioning the extruded substance on a baked food item, wherein the moldable substance is configured to be molded into a desired shape, positioned at a location relative to a cake batter, baked with the cake batter, and separated from the baked cake, having imparted a shape substantially similar to or substantially complementary to the desired shape onto the resulting cake. The desired spatial feature may include a desired cross-sectional shape. The positioning may include extruding the moldable, edible substance onto the baked food item. The extruder may include a cylindrical shape with an opening on each of two opposing ends of the extruder. The component may include a stop pushed into an opening of the extruder and/or a lever. The hole may include one or more slits. The method may further include extruding the moldable, edible substance through a plurality of holes on the extruder and/or positioning a design component in front of the hole; and extruding the moldable, edible substance through the hole on the extruder and subsequently through the design component. The design component may include a plastic sheet with one or more openings, which may include a slit. The moldable, edible substance may include one or more partially or fully hydrogenated fats, wherein the one or more fats are between about 25% and about 40% of the total weight of the moldable substance. The moldable, edible substance may include one or more oleaginous materials, wherein the oleaginous materials are between about 25% and about 40% of the total weight of the moldable substance and/or wherein an amount of the oleaginous materials in the moldable, edible substance is sufficient to enable the substance to be placed directly adjacent to a cake batter and baked and to be easily separatable from the baked cake. The moldable, edible substance may include an ingredient with a density less than about 120 g/cup, wherein an amount of the ingredient in the moldable, edible substance is sufficient to prevent the substance from sticking to a plastic surface. The ingredient may be more than about 20% of the total weight of the moldable, edible substance and/or the ingredient may include or may be powdered sugar. In some embodiments, the moldable, edible substance does not include more than about 1% of a non-oleaginous liquid ingredient and/or of a liquid ingredient.

In some embodiments, a package is provided, the package including a moldable, edible substance; and a instructions and/or label, wherein the instructions and/or label indicates that the moldable substance may be used to decorate a baked food item and that a shape of the moldable substance may at least partially determine the shape of an undecorated food item.

In some embodiments, a package is provided, the package including a component configured to be a flexible strip; and instructions, wherein the instructions indicate that subsequent to bending the strip at least partly around a shape, a shape of a food item baked adjacent to the strip is at least partly controlled by the position of the strip. The component may be configured to form the flexible strip following combination with one or more liquid ingredients. The flexible strip may be edible.

In some embodiments a method for making cake stencils is provided, the method including receiving input data from a user, the input data comprising a desired cake shape; outputting a cake stencil with a shape similar to the desired cake shape; instructing the user to print the cake stencil; instructing the user to form walls along the outline of the stencil using at least one of a moldable substance and one or more flexible strips; and instructing the user to position a cake batter inside a shape formed by the formed wall.

In some embodiments, a method for baking a cake is provided, the method including molding a first portion of a moldable substance into a desired shape; positioning a cake batter at a location relative to the moldable substance; and baking the cake batter and the moldable substance, wherein the resulting baked cake batter comprises a shape substantially similar to the desired shape or substantially complementary to the desired shape. The method may further include decorating the resulting baked cake batter using a second portion of the moldable substance. The second portion may include a different color and/or a different flavor than the first portion.

In some embodiments, a method of baking a baked item (e.g., a cake) is provided, the method comprising: positioning an edge-supported flexible strip on a surface (e.g., a smooth, flat and/or substantially flat surface) along at least part of desired shape; joining an end of the flexible strip with at least one of another end of the same flexible strip, an end of another flexible strip, and a side surface of a container; positioning an initial food item next to the strip, said strip at least partially containing said initial food item within the desired shape; baking the initial food item and the strip; and separating the baked food item from the baked strip, wherein the resulting baked food item comprises a shape substantially similar to the desired shape, and wherein the flexible strip is joined without using a mechanical fastening component. The strip may be positioned such that at least a portion of the strip is not supported by a side of a container (such as, for example, a cake pan). The desired shape may be a closed shape, a non-rectangular shape, a non-circular shape, a non-oval shape, a non-primary shape, a non-standard shape, and/or non-elementary shape. The method may further include pressing two ends of the strip together to form the desired shape. The method may further include applying a substance to a first end of the strip; and contacting a second end of the strip with the first end after the application of the substance, thereby forming the desired closed shape. The method may further include positioning a plurality of flexible strips to make a desired closed shape and/or disposing a substance between one end of the strip and a surface. The surface may include a surface of a baking pan. The strip may be separated from said food item by cutting said strip. The strip may be edible. The strip may comprise silicon. The method may further include providing a drawing; and positioning the strip along one or more lines of the drawing, wherein said resulting baked item comprises a shape substantially similar to a shape of the drawing. The drawing may be provided on parchment paper. The strip may be configured to support itself as the initial food item bakes. In some instances, the strip is not supported by a side of a pan. The strip may be characterized by a length, a width and a thickness, the length being at least as long as the width, and the width being at least as wide as the thickness, and the strip may have a length-to-width ratio of at least about 2. The desired shape may be a closed shape, the positioning the strip may include positioning one or more flexible strips along the desired shape, the desired shape being a closed shape, the food item may include a cake batter, the positioning the initial food item may include pouring a cake batter inside said closed shape, and/or the shape of the baked cake batter's perimeter may be substantially similar to the desired shape. The strip may comprise flour. The positioning the initial food item may include positioning the initial food item directly next to the strip.

BRIEF DESCRIPTION OF THE DRAWINGS

FIGS. 9A-9C show illustrations of a strip component with vertical grooves.

DETAILED DESCRIPTION OF THE PREFERRED EMBODIMENTS

Figure 1:
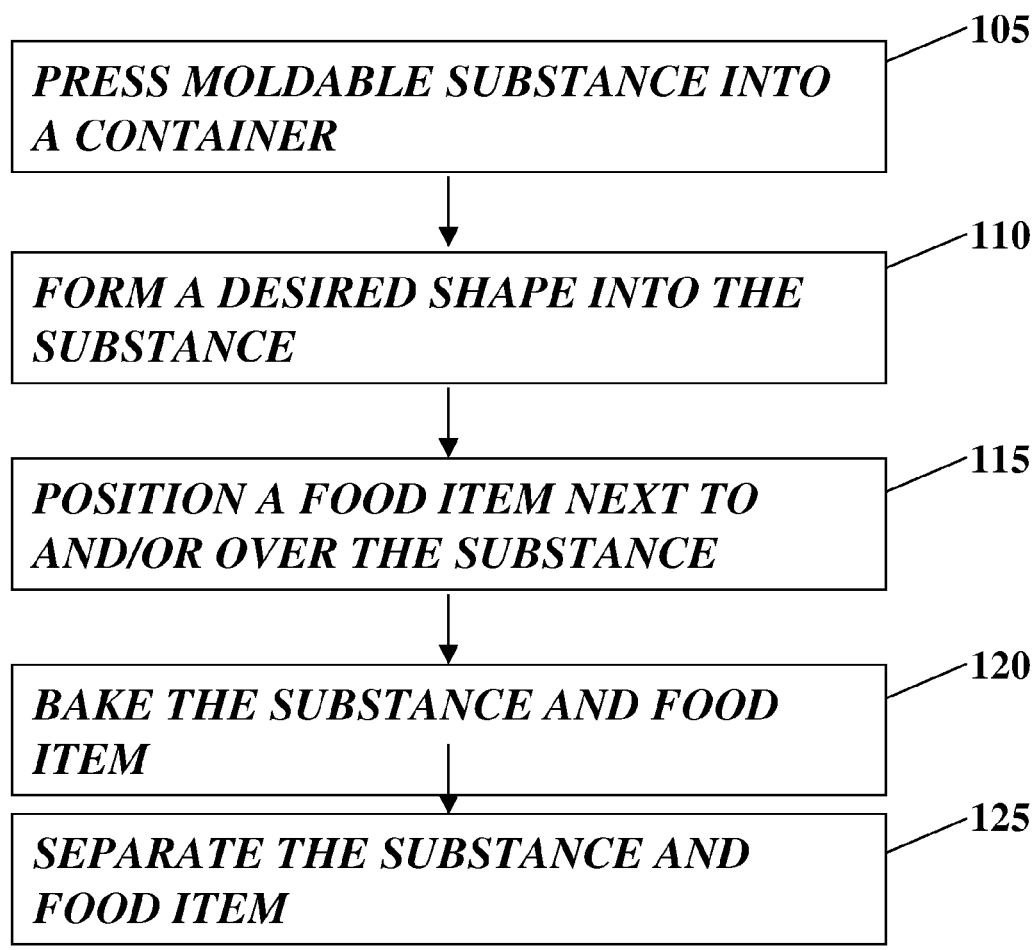
FIG. 1 shows a process for making a food item with a desired shape.

In some embodiments, a substance may be molded or bent to form a desired shape. A food item may be positioned on, over, and/or next to the molded substance such that the shape of the molded substance is imparted into the food item. The shape may be imparted after, for example, the food item has changed state, after baking and/or after chilling. For example, a moldable substance may be formed to form the perimeter of a heart. The heart may be placed onto a baking pan, and cake batter may be poured inside the perimeter formed by the moldable substance. The moldable substance and batter may be baked, and the perimeter of the resulting cake can be similar to that formed by the moldable substance.

A moldable substance may be capable of being shaped or bent into or around a shape (e.g., at normal temperatures, without the application of substantial force and/or in a reversible manner). The substance may be malleable, pliable, joinable, stretchable. A moldable substance may or may not be capable of growing mold.

A moldable substance may include a substance that can be formed into a plurality of shapes. In some embodiments, the moldable substance comprises a viscosity similar to a clay or to a Play-doh® modeling compound, such that three-dimensional impressions and/or shapes may be imparted into the substance. The moldable substance may have a viscosity low enough such that the substance is easy to form into shapes but high enough such that the substance maintains this shape once molded. The moldable substance may be non-sticky or substantially non-sticky. The moldable substance may have a consistency such that approximately ½-inch thick and 3-inch high walls can be formed from the substance. The moldable substance may be moldable at substantially room temperature. For example, the moldable substance may be moldable at temperatures between about 60° F. and about 80° F., between about 65° F. and about 75° F., or at about 70° F. The moldable substance may or may not be moldable at lower temperatures, such as temperatures below about 50° F., about 40° F., about 30° F., about 20° F., or about 10° F. or at higher temperatures, such as temperatures above about 90° F., 100° F., 150° F., 200° F., 300° F., 350° F., or 500° F.

The moldable substance may be configured such that it can maintain a molded shape and/or its structural integrity upon exposure to high temperatures, such as temperatures between about 150° F. and about 500° F., about 200° F. and about 400° F., or about 300° F. and about 400° F. In some embodiments, the moldable substance remains moldable at higher temperatures, such as temperatures up to about 100° F., about 200° F., about 300° F., about 400° F., or about 500° F. In other embodiments, the moldable substance hardens at these higher temperatures. In the latter embodiments, the moldable substance may return to its moldable state or remain at its hardened state upon subsequent cooling to room temperature. In some embodiments, part of the moldable substance may melt at high temperatures. Such melting may impart, for example, a flavor and/or color to an item baking adjacent to the substance.

An initial item (e.g., a cake batter) may be positioned adjacent to the moldable substance and both the item and the moldable substance may be baked. In some items, the moldable substance is baked, warmed, chilled or frozen prior to the positioning of the initial item. The initial item may be an initial food item or a food item. The initial food item may be an item that will transform into a final food item after a cooking process (e.g., baking, heating, cooling, freezing, or letting stand for a time period). For example, the initial food item may comprise a dough, batter, mixture, or melted substance that may be transformed into a cake, cookie, pie, gelatin dessert or frozen dessert subsequent to baking or freezing.

The moldable substance may be configured such that subsequent to such baking or undergoing a cooking process, the moldable substance is substantially separatable from the baked item. The moldable substance may be substantially separatable from the baked item if the baked item can be separated from the moldable substance while substantially preserving the integrity of the baked item. In one example, the moldable substance is positioned inside a baking pan, and cake batter is poured on top of the substance. After the batter is baked, the substance may be configured such that it will substantially stick inside the pan as the cake is removed. In another example, the moldable substance may be removed from the pan along with the cake, but the moldable substance may be easy to remove (e.g., may easily crumble) from the cake. In yet another example, the moldable substance is positioned along a contour, forming walls to contain a cake batter. After the batter is baked, the moldable substance may be separated from the sides of a resulting cake. The moldable substance may be substantially separatable from the baked item at high temperatures, at room temperature, and/or at low temperatures.

In some embodiments, an item (e.g., an ice cream or melted ice cream mixture) may be positioned adjacent to the moldable substance and both the item and the moldable substance may be cooled and/or frozen. The item may be a food item. The moldable substance may be configured such that subsequent to such cooling and/or freezing, the moldable substance is substantially separatable from the cooled and/or frozen item.

The moldable substance may be coated with an agent. For example, the moldable substance may be coated with an oil, sprayed with a cooking spray, and/or dusted with flour and/or powdered sugar after the substance has been formed to a desired shape. The coating may aid in the separation between the moldable substance and an item. The moldable substance may be coated with, for example, powdered sugar or cornstarch before or after a desired shape is formed.

The moldable substance may comprise a mixture of a plurality of components. The ratio of the components may be adjusted to, for example, improve adhesion within the mixture, decrease adhesion between the mixture and non-mixture elements (such as pans or food items), and/or improve the moldability of the mixture. In some embodiments, the mixture is whipped to incorporate air into the mixture.

The moldable substance may be non-toxic. The moldable substance may or may not be edible. The moldable substance may have a sweet taste. The moldable substance may comprise a hydrophobic substance and/or an oleaginous material. The hydrophobic substance and/or the oleaginous material may comprise a material selected from the group consisting of cocoa butter, a nut butter, milk fat, canola oil, corn oil, a nut oil, soybean oil, hydrogenated vegetable oil and mixtures thereof. The moldable substance may comprise a nut butter, such as peanut butter, non-hydrogenated and/or hydrogenated oil (e.g., vegetable oil), and/or shortening. In some embodiments, the moldable substance is characterized by a high fat content and/or a high saturated fat content. The moldable substance may comprise a fat that is a solid at room temperature. The moldable substance may comprise an unsaturated fat. The moldable substance may comprise palm oil.

The moldable substance may include one or more fats or oleaginous materials, wherein the one or more fats or oleaginous materials are less than about 60%, 50%, 45%, 40%, 35%, 30%, 25%, 20%, or 15% of the total weight of the moldable substance and/or wherein the one or more fats or oleaginous materials are more than about 0.1%, 0.5%, 1%, 5%, 10%, 15%, 20%, 25%, 30%, 35%, 40%, 45%, or 50% of the total weight of the moldable substance. The one or more fats may include only the fully saturated fats in the substance, only the partially saturated fats in the substance, only the unsaturated fats in the substance, both the fully and partially saturated fats in the compositions, or all of the fully saturated fats, the partially saturated fats, and the unsaturated fats in the composition. One or more oleaginous materials, hydrophobic substances, fats, hydrogenated fats, and/or partially hydrogenated fats may be present in a moldable, edible substance in an amount sufficient to enable the substance to be placed directly adjacent to a cake batter and baked and to be easily separatable from a resultant baked cake.

The moldable substance may include a liquid ingredient, wherein the liquid ingredient is not more than about 30%, 25%, 20%, 15%, 10%, 5%, 4%, 3%, 2%, 1%, 0.5%, 0.3%, 0.2%, 0.1%, 0.05%, 0.03%, 0.02%, or 0.01% or is about 0% of the total weight of the substance. The moldable substance may include a non-oleaginous liquid ingredient, wherein the non-oleaginous liquid ingredient is not more than about 30%, 25%, 20%, 15%, 10%, 5%, 4%, 3%, 2%, 1%, 0.5%, 0.3%, 0.2%, 0.1%, 0.05%, 0.03%, 0.02%, or 0.01% or is about 0% of the total weight of the substance.

The moldable substance may comprise an ingredient that is with a density less than about 200, 175, 150, 140, 130, 120, 110, 100, 90, 80, 70, or 50 g/cup. The ingredient may be more than about 5%, 10%, 15%, 20%, 25%, 30%, 35%, 40%, 45%, 50%, 55%, 60%, or 70% of the total weight of the substance. The ingredient may comprise powdered sugar. The moldable substance may comprise an amount of the ingredient and/or of powdered sugar sufficient to prevent the substance from sticking to a plastic surface.

The moldable substance may comprise one or more of water, salt, corn starch, monoglycerides, and diglycerides. The moldable substance may comprise a sweetener, such as a sugar sweetener and/or a sugar substitute. Sugar sweeteners may include saccharide containing components including but not limited to sucrose, dextrose, maltose, dextrin, dried invert sugar, fructose, levulose, galactose, corn syrup solids, and the like, alone or in combination. Sugarless sweeteners include but are not limited to sugar alcohols such as sorbitol, mannitol, xylitol, hydrogenated starch hydrolysates, maltitol, and the like, alone or in combination; sucralose; aspartame; salts of acesulfame; alitame; saccharin and its salts; cyclamic acid and its salts; glycyrrhizin; dihydrochalcones; thaumatin; monellin; and the like, alone or in combination. The moldable substance may comprise dyes or coloring agents. The moldable substance may comprise flavorings. The flavoring may include anything to produce a desirable taste, such as vanilla, chocolate, cocoa, mint, peppermint, cinnamon, fruit, fruit extracts and essences, nuts and nut extracts, chili pepper, caramel, peanut butter, sarsaparilla, sassafras, wild cherry, wintergreen, ginger, nutmeg, honey, malt, grain flavors, paprika, garlic, salt and others well known to those of skill in the art. The moldable substance may comprise one or more preservatives. In some embodiments, the moldable substance comprises flour, while in other embodiments it does not contain flour.

The moldable substance may comprise one or more of water, salt, a lubricant, a surfactant, a starch-based binder, a preservative, a hardener, retrogradation inhibitor, humectant, fragrance, and a colorant.

The substance may comprise more than about, about and/or less than about 0%, 1%, 5%, 10%, 15%, 20%, 30%, 50%, 60% or 70% wt water. The substance may comprise more than about, about and/or less than about 0%, 0.01%, 0.1%, 0.5%, 1%, 5%, 10%, 15%, 30% or 50% wt salt. The salt may comprise one or more of sodium chloride, calcium chloride, and potassium chloride. The substance may comprise more than about, about, or less than about 0%, 0.01%, 0.1%, 0.5%, 1%, 2%, 3%, 4%, 5%, 10%, 20%, 30% or 50% wt lubricant. The lubricant can be selected from, for example, mineral spirits, mineral oil, and vegetable oil.

The substance may comprise more than about, about, or less than about 0%, 0.01%, 0.05%, 0.1%, 0.2%, 0.3%, 0.5%, 1%, 2%, 5%, 10% or 20% wt surfactant. The surfactant can be selected from polyethylene glycol esters of stearic acid, polyethylene glycol esters of lauric acid, ethoxylated alcohols, polyoxyethylenesorbitan monostearate (e.g., Tween-.RTM. 60, ICI Americas, Inc., Wilmington, Del.), and polyoxyethylenesorbitan monolaurate (e.g., Tween.RTM. 20, ICI Americas, Inc., Wilmington, Del.). The surfactant is preferably hydrophilic, and can have an HLB (hydrophile lipophile balance) value of about 12 to about 15.

The substance may comprise more than about, about, or less than about 0%, 0.1%, 1%, 5%, 10%, 15%, 20%, 25%, 30%, 35%, 40%, 50%, or 60% wt starch-based binder. The starch-based binder can include one or more of wheat flour, rye flour, rice flour, tapioca flour, and corn flour.

The substance may comprise more than about, about, or less than about 0%, 0.01%, 0.05%, 0.1%, 0.2%, 0.5%, 1%, 3%, 5% or 10% wt preservative. The preservative may include one or more of calcium propionate, sodium benzoate, methyl paraben, ethyl paraben, butyl paraben, and borax.

The substance may comprise more than about, about, or less than about 0%, 0.01%, 0.05%, 0.1%, 0.5%, 1%, 2%, 3%, 5% or 10% wt hardener. The hardener may include one or more of sodium aluminum sulfate, potassium aluminum sulfate, aluminum ammonium sulfate, aluminum sulfate, and ammonium ferric sulfate.

The substance may comprise more than about, about, or less than about 0%, 0.01%, 0.05%, 0.1%, 0.5%, 1%, 2%, 5%, 10%, 20%, or 30% wt retrogradation inhibitor. The retrogradation inhibitor may include one or more of amylopectin, waxy starch, waxy corn starch, waxy rice starch, and waxy potato starch.

The substance may comprise more than about, about, or less than about 0%, 0.01%, 0.05%, 0.1%, 0.5%, 1%, 2%, 5%, 10%, 20%, 25%, 30%, 40% or 50% wt humectant. The humectant can include glycol, such as glycerin or a low molecular weight polyethylene glycol.

The substance may comprise more than about, about, or less than about 0%, 0.01%, 0.05%, 0.1%, 0.5%, 1%, 2%, 5% or 10% wt fragrance. The fragrance may be, for example, any water-dispersible, nontoxic fragrance.

The substance may comprise more than about, about, or less than about 0%, 0.01%, 0.05%, 0.1%, 0.5%, 1%, 2%, 5% 10% or 20% wt colorant. The colorant may include, for example, any nontoxic dyes, pigments, phosphorescent pigments, or macro-sized particles such as glitter or pearlescent materials. The substance may also include an acidulant. The acidulant may be selected from citric acid, alum, and potassium dihydrogen sulfate. The substance may have a pH of about 3.5 to about 4.5. The substance may have a pH of about 3.8 to about 4.0.

The substance may be formed by mixing a first mixture including a salt, lubricant, surfactant, starch-based binder, preservative, and retrogradation inhibitor; adding water that is heated to about 150° F. or about 170° F. to the mixture.

One embodiment includes a substance comprising about 3% to about 10% sodium chloride; about 3% to about 10% calcium chloride; about 0.5% to about 1.1% aluminum sulfate; about 0.35% to about 0.80% 10 mol borax (i.e., borax decahydrate); about 0.1% to about 0.5% sodium benzoate; about 30% to about 38% wheat flour; about 3.5% to about 7.0% waxy corn starch; about 0.4% to about 1.0% PEG 1500 monostearate; about 2.5% to about 4.0% mineral oil; about 0.05% to about 0.25% vanilla fragrance; and the remainder water (about 45%); wherein the amounts of aluminum sulfate and borax are adjusted so that the substance has a pH of about 3.5 to about 4.5. The substance may be pigmented to nearly any desired color. For example, to obtain a blue fluorescent color, the substance may include about 0.2 to about 1 part by weight Day-Glo.RTM Horizon Blue (Day-Glo Color Corp., Cleveland, Ohio) to about 100 parts of the composition. To obtain a red color (lake pigment), the substance may include about 0.1 to about 0.5 parts by weight FD&C Red No. 40 dye aluminum lake to about 100 parts of the substance.

According to still another embodiment, a method of preparing a moldable substance includes the steps of:
  (a) providing a mixer; and
  (b) adding the following ingredients to the mixer:
    (1) about 5% to about 15% salt;
    (2) about 2.0% to about 4.5% lubricant;
    (3) about 0.2% to about 1.0% surfactant;
    (4) about 30% to about 42% starch-based binder;
    (5) about 0.1% to about 1% preservative;
    (6) about 2% to about 10% retrogradation inhibitor; and
    (7) about 20% to about 50% water; and
  (c) mixing the ingredients for at least about 5 minutes.

The substance may also include: 0% to about 1% hardener; 0% to about 25% humectant; 0% to about 0.5% fragrance; and 0% to about 3.5% colorant. The salt, lubricant, surfactant, starch-based binder, preservative, and retrogradation inhibitor may be mixed to form a first mixture prior to adding the water to the first mixture; and the water can be heated to a temperature of at least about 150° F. prior to adding the water to the first mixture. The water can be heated to a temperature of at least about 170° F. prior to adding the water to the first mixture. Any suitable mixer can be used, such as an ordinary bakery dough mixer, e.g. an FKM series batch mixer (Littleford Day Inc., Florence, Ky.).

The substance may include a substance described in U.S. Pat. Nos. 6,713,624 or 3,167,440. The substance may include ingredients described in U.S. Pat. Nos. 6,713,624 or 3,167,440, both of which are hereby incorporated by reference in their entireties. The substance may include Play-doh® modeling compound.

A moldable substance as described herein may be resistant to retrogradation and may have a soft, flexible texture that is low in viscosity and stickiness. For example, approximately 48 hours after preparing a moldable substance as described herein, such a substance may have a viscosity of, e.g., about 18,000 Pascal seconds. Moldable substances may have a soft, flexible texture, low viscosity and stickiness, and/or resistance to retrogradation, which may make the substance easier to use for molding, extruding, or sculpting shapes or figures.

Moldable substances may include decorations within the substances. For example, the moldable substance may include colored dots, fragments, or streaks. The decorations may be edible. The moldable substance may include sprinkles. The decoration may be coated on an exterior surface of the moldable substance or dispersed throughout the substance.

The moldable substance may affect a taste or texture of a surface of an item formed next to the moldable substance. A cake batter may be positioned next to the moldable substance, and both may be baked. The moldable substance may impart a flavor into a surface of the cake during the baking.

The moldable substance may cause a surface of the cake to be crisper than would otherwise be expected from a cake surface.

Forming an item with a particular shape using a moldable substance may provide advantages over forming the shape by cutting an initial item. For example, a cake may be formed into a desired shape using the moldable substance. The moldable substance may, in general, improve definition of one or more cake surfaces, improve accuracy of a contour of the cake, and/or decrease the crumbliness of one or more cake surfaces, to an extent greater than would be expected if a comparably shaped cake had been produced by cutting a cake. The surface formed adjacent to the moldable substance may be easier to frost (e.g., at least partly due to the reduced crumbliness) as desired as compared to a cut surface.

Components may be provided that are configured to be a moldable substance. For example, a mix may be provided that is configured to become a moldable substance upon the combination with one or more additional ingredients. For example, the components may be combined with a liquid ingredient, such as water and/or an oil to form the moldable substance. The components may be combined with water and/or a hydrophobic ingredient, such as oil, shortening (e.g., fully hydrogenated, partially hydrogenated or un-hydrogenated shortening) and/or peanut butter, to form the moldable substance. After combining the ingredients and the components, the mixture may be, for example, heated such that the desired consistency is formed. It may then be shaped into a desired shape or into bendable components (e.g., strips) that may be bent around a desired shape.

The moldable substance may be provided in a resealable container. In some embodiments, this enables a portion of the moldable substance to be used at a time. In other embodiments, this permits for the moldable substance to be reused.

FIG. 1 is a flow diagram illustrating a process 100 for making a food item with a desired shape. Depending on the embodiment, additional steps may be added, others removed, and the ordering of the steps rearranged.

Figure 2A:
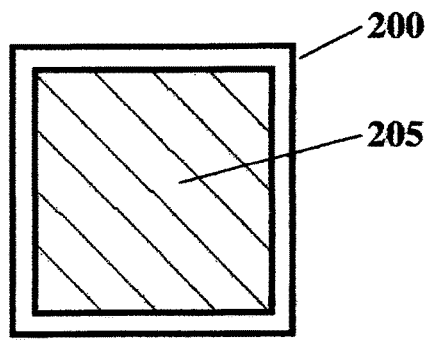
FIGS. 2A-2G show illustrations of making a food item with a protruding desired shape.
Figure 2D:
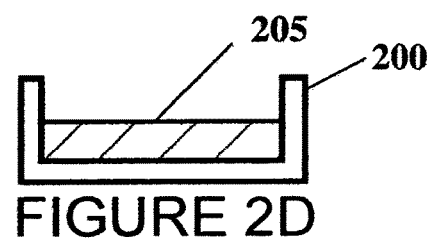
Figure 2B:
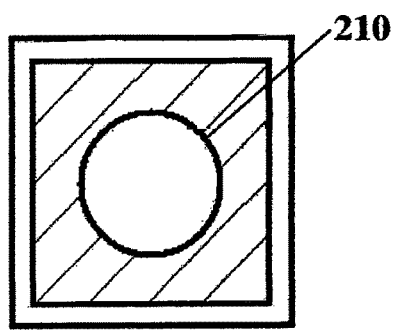

Process 100 begins at step 105 with the pressing a moldable substance into a container. This process step is illustrated in FIGS. 2A and 2B, which show top-down and cross-sectional views of a moldable substance 205 that is evenly distributed across a square container 200. Depending on the embodiment, it may be desirable that the moldable substance be relatively evenly distributed across the container. In some embodiments, the moldable substance 205 is positioned, dropped, and/or spread in the container 200. The container 200 may comprise any suitable container that may provide a support for the moldable substance 205. The container 200 may or may not comprise walls. The container 200 may be configured to withstand heat and/or cold. The container 200 may comprise a metal container, such as a baking sheet or a baking pan. The container 200 may be coated in a substance, such as a fat, an oil, cooking spray, or flour.

Figure 2E:
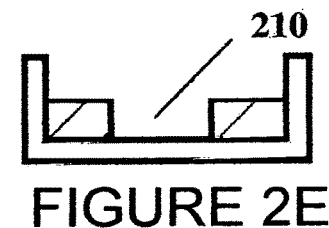
Figure 2C:
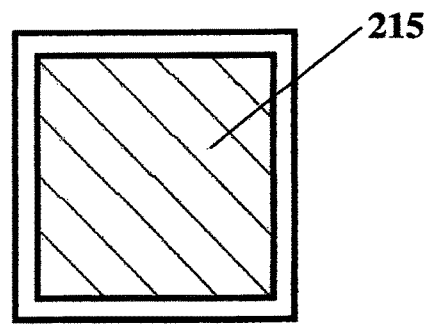

Process 100 continues at step 110 with the forming of a desired shape into the substance 205. In FIGS. 2C and 2D, this process step is illustrated as the desired shape 210 of a circular indentation is formed within the moldable substance 205. In this illustration, the desired shape 210 comprises a cavity within the moldable substance 205 which extends to the bottom of the pan 200. In other embodiments, a cavity may be formed that does not reach the bottom of the pan, or a structure that varies in the depth of the shape may be formed within the moldable substance 205. The shape 210 may be formed, for example, by forming the shape with a user's hands, by pressing an object into the moldable substance 205 to form an indentation, by molding the substance 205 around an object, or any other appropriate technique. In some embodiments, instead of the desired shape 210 comprising an indentation or cavity, the desired shape 210 may comprise an elevated surface. Alternatively, indentations or cavities may be formed on the perimeter of the moldable substance 205. In some embodiments, once the desired shape 210 has been imparted into the moldable substance 205, the formed moldable substance is treated or undergoes a processing step. For example, the formed moldable substance may be baked, frozen, and/or coated with a substance.

Figure 2F:
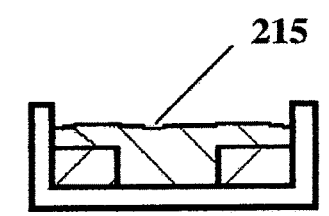

Process 100 continues at step 115 with the positioning of an initial item next to and/or over the moldable substance 205. Thus, the initial item may be adjacent to (bordering) the moldable substance 205. In FIGS. 2E and 2F, this process step is illustrated as an initial item 215 is positioned over and next to the moldable substance 205. While in some embodiments, the positioned initial item 215 comprises a food item, in others it is not. The initial item 215 may comprise an item to be baked, heated, cooled, or frozen. The initial item 215 may comprise an item that is of substantially liquid form. The item 215 may be expected to change state, such as to a solid form, upon processing, letting stand, baking, heating, cooling, or freezing. The initial item 215 may be less viscous than the moldable substance 205.

Process 100 continues at step 120 with the baking of the moldable substance 205 and the initial item 215. The moldable substance 205 and the initial item 215 may be baked at any suitable temperature for any appropriate period of time. Temperatures and durations may be chosen based upon, for example, those required for the initial item 215 to change states. For example, if the initial item 215 comprises a cake batter, temperatures and durations may include those suitable for the cake batter to be transformed into a cake. In some embodiments, process step 120 is replaced by a step of heating, cooling, or freezing the moldable substance 205 and the initial item 215.

Figure 2G:
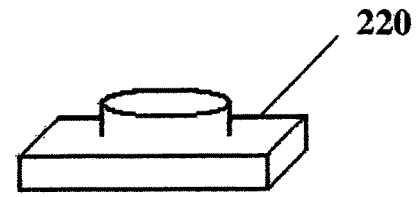
Figure 3A:
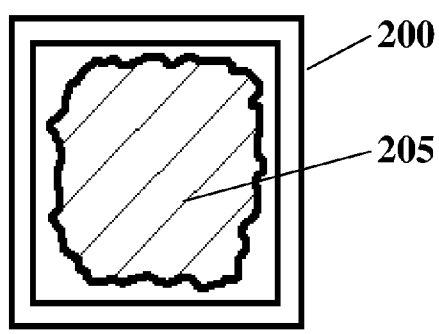
FIGS. 3A-3G show illustrations of making a food item of a desired shape.
Figure 3B:
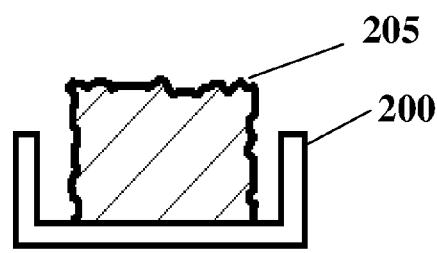
Figure 3C:
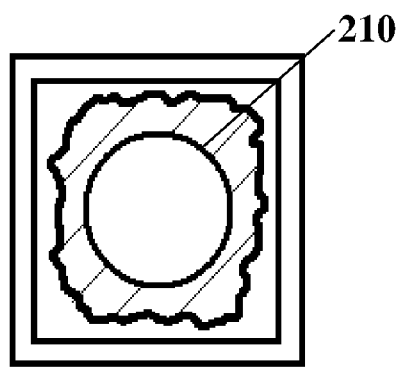
Figure 3D:
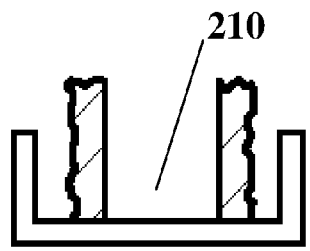
Figure 3E:
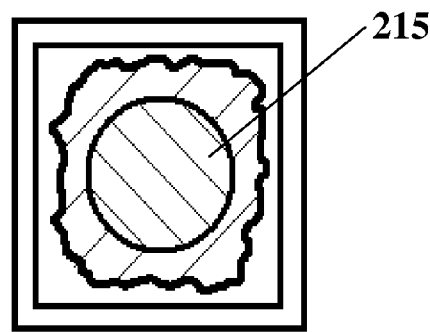
Figure 3F:
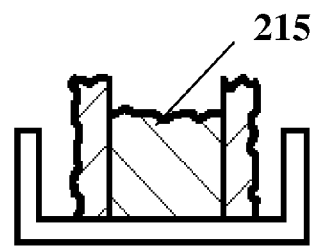
Figure 3G:
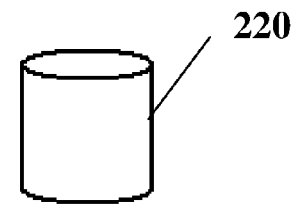

Process 100 continues at step 125 with the separating of the baked moldable substance 205 and baked initial item 215. FIG. 2G shows a resultant baked food item 220, which includes spatial characteristics imparted by the shape of the moldable substance 205. In some embodiments, both the moldable substance 205 and the resultant item 220 are removed from the container 200, and they may subsequently be separated. In other embodiments, the resultant item 220 is removed from the container separately from the moldable substance 205. The moldable substance may—in some instances—stick to the pan, such that inversion of the container allows the resultant item 220 to be released from the pan, thereby separating from the moldable substance.

FIG. 3 shows an illustration of an embodiment in which the moldable substance 205 forms walls used to form the shape of the sides of the resultant item 220. As shown in FIGS. 3A and 3B, it is not necessary in this embodiment that the moldable substance 205 cover the entirety of the container 200. The moldable substance 205 may be positioned to extend beyond the area encompassing the desired shape 210. As shown in FIGS. 3C and 3D, the desired shape 210 may be formed in the moldable substance 205. In this instance, the moldable substance 205 is formed to comprise relatively tall walls, extending above the walls of the container 200. Notably, the height of the moldable substance 205 (and also possibly the height of the walls of the container 200) can affect the dimensions and total size of the resultant baked food item 220. As shown in FIGS. 3E and 3F, the item 215 is then positioned next to or inside the moldable substance 205. Thus, in this embodiment the resultant item 220 only reflects the shape of the moldable substance 205 and is not influenced by the shape of the container 200.

Figure 4:
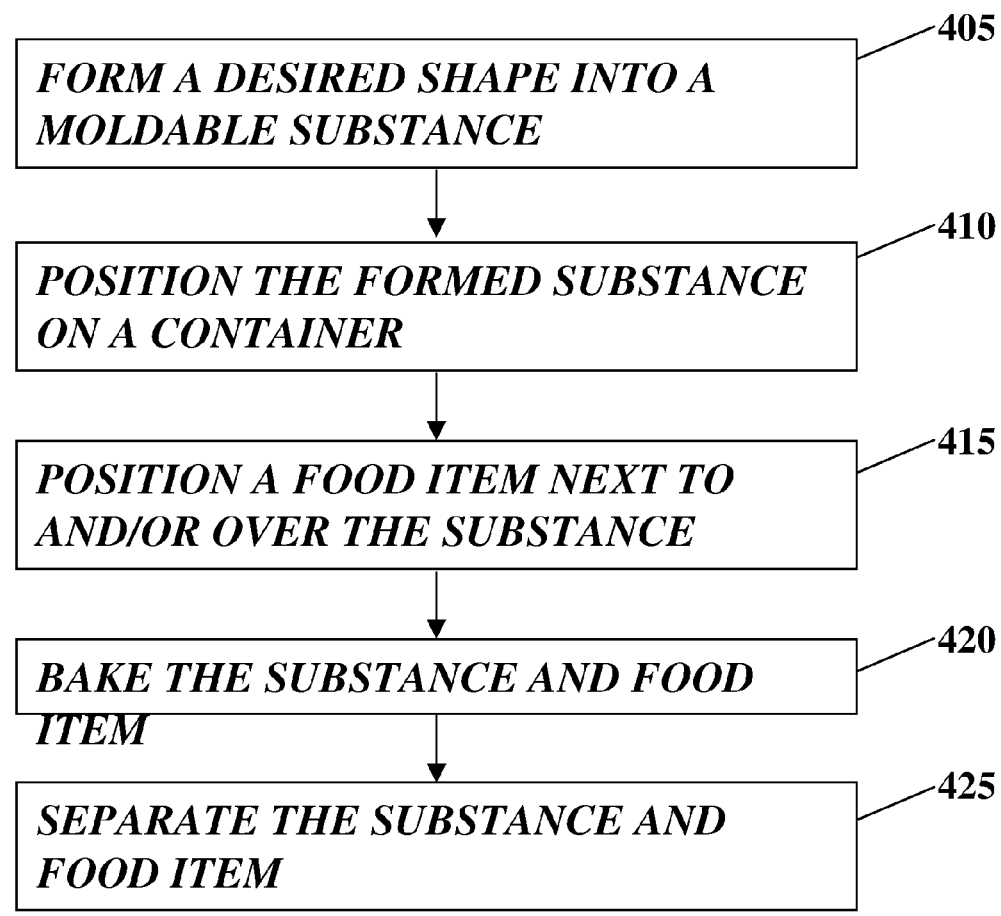
FIG. 4 shows a process for making a food item with a desired shape.

FIG. 4 is a flow diagram illustrating another process 400 for making a food item with a desired shape. Depending on the embodiment, additional steps may be added, others removed, and the ordering of the steps rearranged.

Figure 5A:
FIGS. 5A-5G show illustrations of making a food item with an indented desired shape.
Figure 5B:
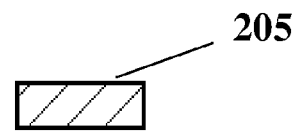

Process 400 begins at step 405 with the forming of a desired shape 205 into a moldable substance 205. The moldable substance 205 may be formed to have the desired shape 210 indented into itself or protruding from itself, or it may be formed such that its shape is equivalent to that of the desired shape 210. FIGS. 5A and 5B show top-down and cross-sectional views, respectively, of a moldable substance 205, formed to have the same dimensions as a desired shape.

Figure 5C:
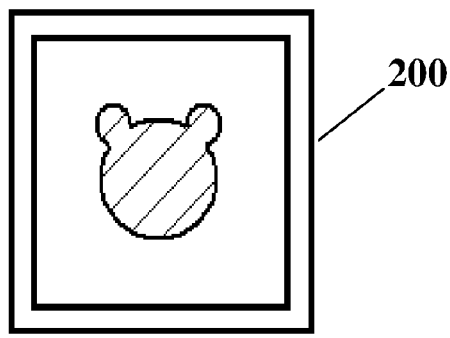
Figure 5D:
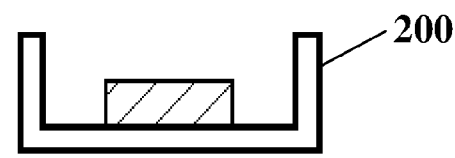

Process 400 continues at step 410 with the positioning of the formed substance on or in a container. In some embodiments, in which the moldable substance 205 is formed to have walls, this step may be unnecessary. FIGS. 5C and 5D show that the formed moldable substance 205 is positioned within the center of the container 200.

Figure 5E:
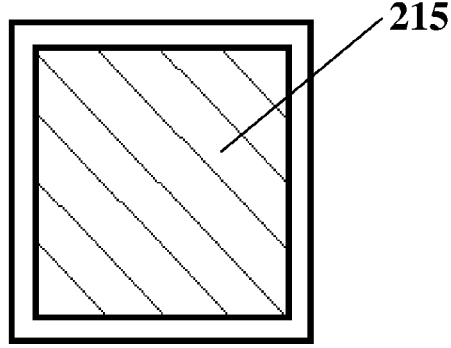
Figure 5F:
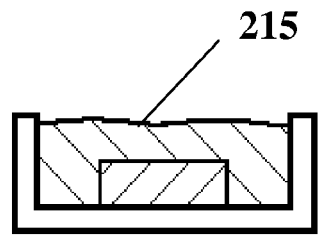

Process 400 continues at step 415 with the positioning of an initial item 215 next to and/or over the moldable substance 205. FIGS. 5E and 5F show illustrations for which the item 215 is both next to and over the moldable substance 205. In embodiments in which the formed moldable substance 205 is not positioned within the container 200, the initial item 215 may be positioned inside the moldable substance 205.

Process 400 continues at step 420 with the baking of the substance and the initial item 215. In some embodiments, process step 420 is replaced by a step of heating, cooling, or freezing the moldable substance 205 and the initial item 215.

Figure 5G:
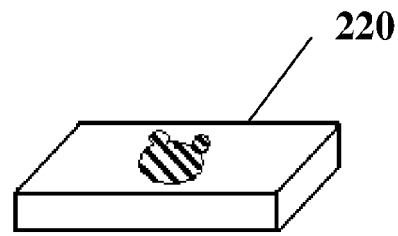

Process 400 continues at step 425 with the separating of the substance 205 and the initial item 215. FIG. 5G shows the resultant item 220, which includes an indentation of the desired shape 210. Notably, the resultant item 220 may comprise a partial or full cavity (the full cavity extending entirely through the resultant item) instead of an indentation depending upon the height of the formed moldable substance 205 and/or the quantity of the initial item 215 added to the container.

In some embodiments, the moldable substance may be coated with a coloring or a flavoring substance. For example, a portion or all of the moldable substance may be coated with a food dye after the moldable substance is formed in a desired shape. The food dye may then be at least partially transferred to a surface of a food item positioned adjacent to the moldable substance. The coloring substance may comprise, for example, a gel-like substance.

In some embodiments, the moldable substance is separated from a food item by a separation layer, while in other embodiments it is not. The separation layer may be positioned over, on and/or adjacent to the moldable substance before or after the moldable substance has been formed. The separation layer may comprise a flexible layer. The separation layer may comprise, for example, aluminum, aluminum foil wax paper, and/or parchment paper. The separation layer may be elastic and/or stretchable. The separation layer may be coated with a coating substance before a food item is positioned on or adjacent to the separation layer. The coating substance may comprise, for example, a cooking spray, an oil, flour, or a sugar. The separation layer may be configured to withstand high temperatures. In some embodiments, the separation layer may encapsulate the moldable substance.

An initial food item may then be positioned over and/or next to the separation layer. After baking (or heating, cooling, letting stand, freezing, or undergoing some other process), the separation layer may make it easier to separate the resultant item from the substance. For example, ends of the separation layer may extend around the resultant item, so that a user can use the ends to help lift the resultant item from a container.

As described above, moldable substances may be positioned within containers either before or after they are formed into a desired shape. In some embodiments, the shape of the base of a resultant item (e.g., a baked item) depends on the shape of the container.

Notably, the formed moldable substance will occupy a portion of the volume of a pan. Thus, it may be undesirable to fill a pan with the same volume of an item as would have been used without the moldable substance. For example, if a large portion of a 9-inch square pan were occupied by a formed moldable substance, then the amount of, for example, cake batter to be poured into the pan should be reduced. In some embodiments, a specific or maximum volume of the moldable substance may be associated with a pan. For example, it may be acceptable to use a certain volume of the moldable substance in a 13×9-inch pan without having to alter recipes to reduce the volume of a food item baked within the pan. In some embodiments, indications of an appropriate amount of the moldable substance that may be used for a particular pan size is provided. In some embodiments, the indication provides instructions for adjusting the volume of a recipe. For example, the indication may indicate that the volume of the food item should be adjusted such that the height of the food item before baking is about ⅔ or less of the height of the pan.

In some embodiments, the moldable substance may be provided (e.g., in a kit) with a baking pan comprising side walls that are taller than conventionally-sized pans. For example, the moldable substance may be provided with a 13×9×3-inch baking pan.

Moldable substances described herein may be used to form a shape of any item being formed. In some embodiments, the item comprises a food item. In some embodiments, the item comprises a food item to be baked, heated, cooled, frozen or otherwise processed. The item may comprise a food item that is configured to undergo a state change upon baking, heating, cooling, freezing, or other processing. The food item may be formed from a batter or a mixture. The food item may comprise, for example, one or more of a cake, bar cookies, brownies, cupcakes, cookies, a pie, muffins and a bread. The food item may comprise, for example, a gelatin, yoghurt, pudding, ice cream, frozen yoghurt, sorbet, gelato, or sherbet food item.

Figure 8A:
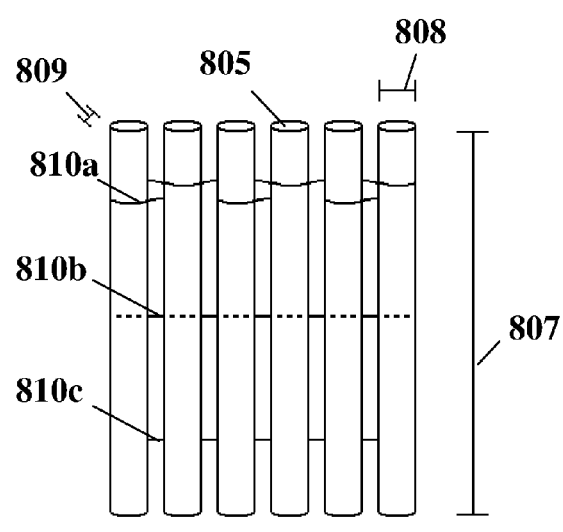
FIGS. 8A-8E show illustrations of support components of a strip.

In some embodiments, one or more strips are provided to, for example, influence the shape of a food item. A strip refers to a long, narrow piece. As shown in FIG. 8A, a strip may comprise a plurality of supports 805. The strip may comprise at least about, about, or less than about 1, 2, 3, 5, 10, 20, 30, 50, 100, 200, 300, 500, 1,000, 2,000, or 5,000 supports 805. The average density of supports per unit length of the strip may be at least about, about, or less than about 1, 2, 3, 4, 5, 6, 8, 10, 20, 50 or 100 supports per inch. The supports 805 may be vertical supports. The supports 805 may be configured and spaced such that the supports can move relative to each and a group of supports can be formed into a variety of shapes.

A support 805 may have a length 807 that is at least about 1, 2, 5, 10, 15, 20 or 50 times the width 808 and/or the thickness 809 of the support 805. The support 805 may have a circular cross section, as shown in FIG. 8A, where the width 808 and thickness 809 are substantially equal to a diameter of a circle. In other embodiments, the support 805 has a rectangular, a planar cross section, and/or at least one substantially flat surface. An example of a support 805 with a planar cross section is shown in FIG. 8C. The width 808 of the support 805 may be at least about 0.5, 1, 2, 5, 10, 15, 20 or 50 times the thickness 809 of the support 805. The width 808 and/or the thickness 809 may be greater than about, about, or less than about 1 mm, 2 mm, 5 mm, 1 cm, 2 cm, 5 cm, 10 cm, 100 cm, 200 cm, 500 cm. The length 807 may be greater than about, about, or less than about 1 cm, 2 cm, 5 cm, 10 cm, 100 cm, 200 cm, 500 cm. In some embodiments, the width 808 and thickness 809 are between about 1 mm and about 2 cm. In some embodiments, the length 807 is between about 2 cm and about 10 cm. The support 805 may comprise a metal (e.g., aluminum, tin, copper, or stainless steel), wood (e.g., bamboo), and/or silicon. The composition of the vertical support 805 may or may not be such that it can withstand high temperatures, such as temperatures above 300 degrees Fahrenheit. The composition may be such that the support 805 would themselves burn at high temperatures but do not burn (and/or are not harmful or toxic) if substantially or completely covered by another material. In some instances, the support 805 may be substantially or completely rigid, such that it does not easily bend or does not bend at all (e.g., along the length dimension). The vertical supports 805 may individually be end-supporting, such that each can stand on its end for sustained periods of time without other support. In some instances, the vertical supports 805 are not individually end-supporting.

In one embodiment, the supports 805 are connected together. They may be directly connected or indirectly connected. They may be directly connected, e.g., by connecting adjacent supports 805 to each other using one or multiple pieces of string 810, as shown, for example, in FIG. 8A. The string 810 may wrap fully or partly around a first support and then wrap fully or partly around a second support, such as shown by string 810a in FIG. 8A. The string 810 may also extend through a first support and extend through a second support, such as shown by string 810b in FIG. 8A. The string 810 may attach to a first support and attach to a second support, such as shown by string 810c in FIG. 8A. The string 810 may attach to a first and second support through a combination of the above-described attachments (e.g., extending through a first support and attaching to a second support). The string 810 may be replaced by a connector. The connector may be floppy (e.g., like a string), flexible, or semi-rigid. The connector may be a string. The connector may comprise a rigid, pivotable component. For example, the connector may comprise a hinge. The connector may be such that adjacent supports 805 can be moved into different positions relative to each other. In some embodiments, the connector or all connectors connecting supports of an adjacent support pair does not substantially constrain first angular relative positions of adjacent supports 805, the first angular relative positions being along a plane perpendicular to the length 807 of a first support of an adjacent support pair. The connector may constrain fix the relative positional difference of adjacent supports 805. For example, the connector may constrain the supports, such that adjacent supports may not be separated by a space more that about 1 mm, 5 mm, 1 cm, 2 cm, 5 cm or 10 cm. In another example, the connector may constrain the supports, such that adjacent supports may not be separated by a space more than about .0.01, 0.02, 0.05, 0.1, 0.2, 0.5, 1, 2, 5, 10, 20, 50, 100 or 1000 times the average diameter of the adjacent supports. In some embodiments, one or more connectors may fix the distance between adjacent supports, in others, it does not. In this way, a group of supports 805 may be formed into different shapes. As shown in FIG. 8A, multiple connectors may be used to connect adjacent supports 805, which may constrain and/or fix second angular relative positions of adjacent supports, the second angular relative positions being along a plane perpendicular to the width 808 of a first support and/or a plane perpendicular to the thickness 809 of a first support of an adjacent support pair.

Figure 8B:
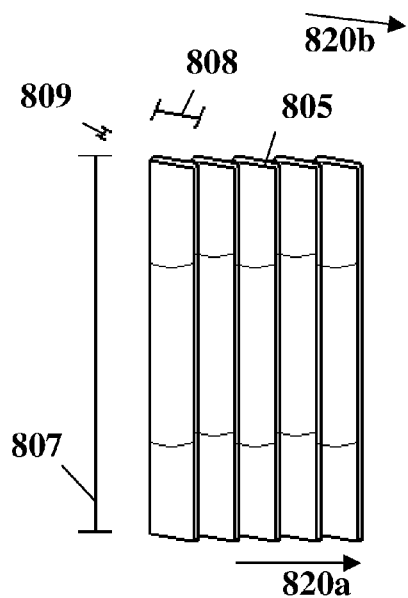
Figure 8C:
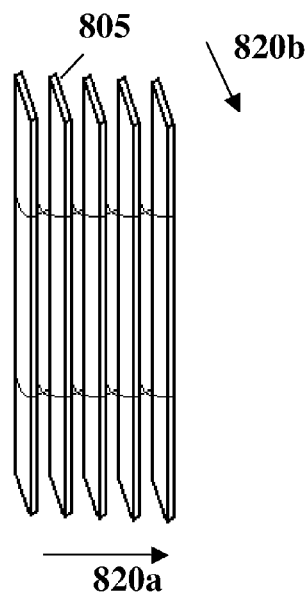

In embodiments where the supports 805 do not comprise substantially circular cross sections, such as the embodiment shown in FIG. 8B, adjacent supports may be connected by a connector that extends through the width of one or more supports 805, extends through the thickness of one or more supports 805, attaches to a support side along the width dimension, and/or attaches to a support side along the thickness dimension. Adjacent supports may be rotatable relative to the vector 820a extending from a center of a first support to a corresponding second support. For example, when a connector is pulled tightly, the vector 820b extending along the direction of the first and/or second support's width is substantially parallel to the vector 820a extending from a center of the first support to a corresponding vector of the second support, as shown in FIG. 8B. While FIG. 8B shows adjacent supports 805 as overlapping, in other embodiments, they do not. When the connector is not pulled tightly, the vector 820b extending along the direction of the first and/or second support's width may be more perpendicular to the vector 820a between the supports' centers, as shown in FIG. 8C. The supports 805 and connectors may be configured such that at least a portion of the supports 805 overlap with at least another portion of adjacent supports 805 for at least some formations that the supports may be shaped into, as shown, for example, in FIG. 8B.

A connected group of supports 805 may be end-supporting. A connected group of supports 805 may be semi-end supporting, such that they do not remain on their ends when the group is positioned along a straight line but does when in a curved or cornered shape. A connected group of supports 805 may be configured such that there is substantially no shape memory (meaning that it has substantially no tendency to restore to a prior shape after having been shaped, bent or deformed) or no default shape of the group. In this instance, if the group of supports 805 is formed, for example, into a "U-shape" or a "V-shape", it would not have the tendency to revert back to a straight line.

Figure 8D:
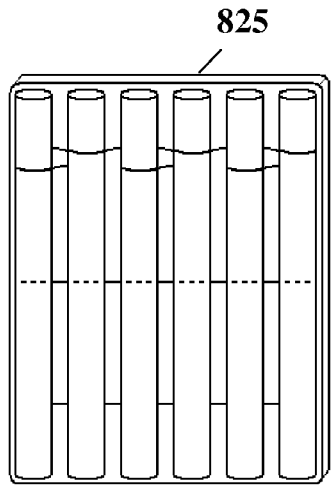

As shown in FIG. 8D, the vertical supports may be connected to, at least partly surrounded by, surrounded by, encased by, at least partly covered by, or covered by an outside layer 825. The outside layer 825 may comprise a metal (e.g., aluminum, tin, copper, or stainless steel) and/or silicon. In some embodiments, the outside layer 825 comprises a material not comprised in the supports 805. In some embodiments, the outside layer 825 and the supports 805 are made from different materials. The composition of the outside layer 825 may be such that it can withstand high temperatures and/or such that it is safe to be in contact with food. The outside layer 825 may or may not comprise a non-stick material. The outside layer 825 may fully surround a group of supports 805; fully cover one side of the group and not the other; fully cover one side and part of the other; partly cover both sides; or only partly cover one side. The outside layer 825 may or may not substantially cover a bottom and/or top end. The outside layer 825 may be connected to the supports by layer-support connectors or the spatial arrangement (e.g., encasement by the outside layers 825) may serve to physically tie the layer 825 with the supports 805. The layer-support connectors may comprise an above-described connector. For example, string may be used to tie supports 805 to the outside layer 825. In some cases, the supports 805 are glued or welded to the outside layer 825. The outside layer 825 may be flexible and/or malleable. The outside layer 825 may be such that it has substantially no shape memory or no default shape. In this instance, if the outside layer 825 is creased, folded or formed, for example, into a "U-shape" or a "V-shape", it would not have the tendency to revert back to a flat plane. Its shape may be substantially controlled by the relative positions of the supports 805. The outside layer 825 may have a thickness of less than about, about, or more than about 0.01 mm, 0.02 mm, 0.05 mm, 0.1 mm, 0.2 mm, 0.5 mm, 1 mm, 2 mm, 5 mm, 1 cm, 2 cm or 5 cm.

Figure 9C:
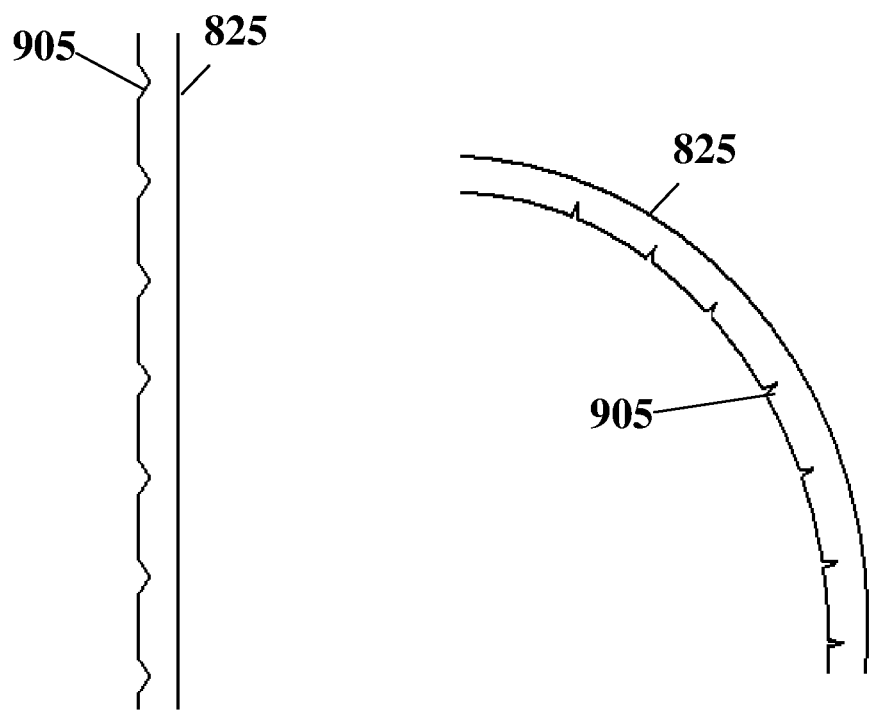
Figure 9C:
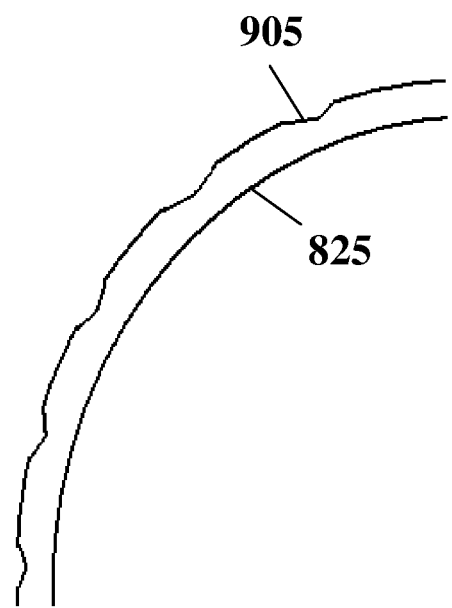

The outside layer 825 may or may not be of uniform thickness. For example, the outside layer may gradually increase its thickness towards the base of the strip. In some embodiments, the outside layer 825 comprises a plurality of grooves 905, as shown in FIGS. 9A-9C. The cross-section of the grooves 905 may be, for example, triangular (e.g., as shown in FIGS. 9A-9C) or rectangular. The grooves 905 may extend along the height direction of the outer layer 825 (e.g., along the direction of the vertical supports 805). The grooves 905 may extend along the entire height of the outside layer 825 or along part of it. The grooves 905 may be such it is easier to bend the outside layer 825. As shown in FIGS. 9B and 9C, the cross sectional area of the grooves 905 may expand or contract as the outside layer 825 is bent. The grooves may allow a thicker piece of material to be used for the outside layer than could otherwise achieve a similar malleability. In some embodiments, both sides of the outside layer 825 comprise grooves 905. In other embodiments, only one side comprises grooves 905. This side may be a side that is not to be positioned next to a food item. This may prevent the food item from becoming trapped in the grooves or from distorting the shape of the food batter. In some embodiments, an outside layer 825 is surrounded by a second outside layer, e.g., to provide a smooth surface. The second outside layer may be at least about 2, 5, 10, 20, or 50 times thinner than the outside layer 825. Thus, a strip may comprise the outside layer 825 with grooves 825 with or without supports 805 and with or without a second outside layer.

Some examples of the advantages that the outside layer 825 may provide include that the outside layer 825 may inhibit or prevent the burning of one or more supports, inhibit or prevent adjacent substances (e.g., cake batter) from being caught between the supports, improve the ease by which the strip can be cleaned, provide smooth boundaries for substances formed nearby (e.g., providing smooth boundaries for a cake formed by pouring cake batter inside a shape formed at least partly by the strip), provide a food-safe surface, and/or inhibit or prevent the supports 805 from suffering from water damage. Some examples of the advantages that the supports 805 may provide include that the supports 805 may inhibit the outside layer 825 from completely or partly collapsing, improve the vertical straightness of boundaries for substances formed nearby (e.g., improving the top-to-bottom straightness of cakes formed by pouring cake batter inside a shape formed at least partly by the strip), improve a smoothness of the boundaries for substances formed nearby (e.g., by preventing unintended jarring shape changes in the formed shape), reduce a thickness that would otherwise be required for the outside layer 825 to hold its shape, make it easier to form the strip in the desired shape.

Figure 8E:
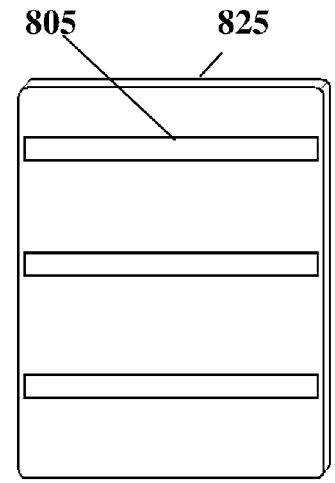

In some embodiments, rather than attaching a group of supports 805 to an outside layer 825, an outside layer 825 is formed by fully or partly coating a group of supports 805. In some embodiments, the supports 805 and the outside layer 825 are made of substantially similar materials. The greater thickness of the supports 805 may provide for greater rigidity than the outside layer 825 has. The outside layer 825 and the supports 805 may thus, in some embodiments, be formed as a single piece. In some embodiments, the outside layer 825 is not connected to, at least partly surrounding, at least partly enclosing or at least partly covering the supports. For example, the outside layer 825 may be thicker and not be connected to supports 805. In some instances, the outside layer 825 is connected to non-vertical supports. For example, one or more supports 805 may run along the length of the outside layer 825, as shown in FIG. 8E. In such an embodiment, the supports 805 may be flexible, malleable and/or semi-rigid. The supports 805 may restrict the configuration of the outside layer 825.

In some embodiments, the supports 805 are not connected to each other using connectors 810. Instead, the supports 805 may be indirectly connected to each other via the outside layer 825. For example, the supports 805 may be connected to the outside layer 805, such that relative movement of the supports 805 is restricted by the outside layer 805. In another instance, the outside layer 805 partly or fully surrounds the strips, again restricting their relatively movement.

In some embodiments, a strip is joined at its ends, to form a closed shape. Thus, the strip may be provided, e.g., in a flexible band. In other instances, the strip is not provided in a closed shape, but can be formed (by itself or in combination with other strips) into a closed shape and "closed", for example, by clipping ends together, wrapping a portion of a first end around a portion of a second end, or using a third layer or device to hold the ends together.

The strip may be configured such that it may be formed along substantially any two-dimensional shape. The strip may be reusable for a finite (e.g., 2, 3, 5, 10, or 50) number of times or for an essentially limitless number of times. In some embodiments, the strip is dishwasher safe. The strip may weigh less than about 1, 2, 4, 8, 16, or 32 ounces.

In some embodiments, the thickness of the strip is substantially uniform, while in other embodiments, the thickness varies. For example, the thickness may taper at the ends of the strip. The strips may be edge-supported, meaning that the strip is configured to be or can be shaped to be supported on one of its edges. The edge-supported strip may be free-standing. In some instances, a thickness of the strip is or can be shaped to be sufficient to balance on its edge. A base of a strip may be configured to make the strip edge supported. For example, the base may comprise a sticky material. In some instances, the bottom of the strip near the edge is moldable and can be pressed into contact with a surface, further supporting the strip. In some instances, additional components, such as a moldable substance, may be used to help provide further support to an edge-supported strip. For example, a clay-like material or a moldable substance may be positioned along the base of a strip in order to keep the strip standing vertically and/or along the desired shape. An edge is defined as a face of the strip, wherein there are at least two other "non-edge" faces that have a larger surface area than the edge. For example, an edge-supported strip may be a strip configured to stand vertically, for example, without support from other components. The edge-supported strip may be configured such that it is capable of maintaining its vertical stance despite an expansion of an initial food item (e.g., during baking), which thereby applies force to a side of the strip.

The strip may be characterized by a length, a width and a thickness, wherein the strip is at least as long as it is wide and at least as wide as it is thick. The strip may have a length-to-width, a length-to-thickness ratio, and/or a width-to-thickness ratio of at least about, about and/or less than about 1, 1.5, 1.75, 2, 2.5, 3, 3.5, 4, 4.5, 5, 6, 7, 8, 9, 10, 15, 20, 30, 40, 50.

One or more strips may be positioned substantially vertically on, for example, a surface (e.g., a smooth, flat and/or substantially flat surface) such as the bottom of a container pan. A strip may be flexible, so that it may be configured to be bent into or along a shape. In some embodiments, a strip is flexible if it can bend without substantially cracking and/or breaking. A flexible strip may be configured to be formed along a perimeter of a circle with a 0.25, 0.5, 1, 2, 3, 4, 5, 6, 7, 8, 9, 10, 15 or 20-inch diameter without substantially cracking and/or breaking. In some embodiments, the flexibility of the strip depends on a material within the strip and not on a mechanical component and/or juncture, such as a clamp, fastener and/or hinge. A desired shape, in some instances, is formed by using one or more flexible strips and—in some instances—one or more sides of a baking pan. The flexible strips may be joinable and/or of an adhesive character, such that an end of one strip can join with an end of the strip, an end of a different strip and/or a side of a container without a mechanical fastening component (e.g., a clamp, hinge, or fastener). Dimensions, such as the thickness of the strips, may influence the flexibility thereof. The strip may be substantially free of rigid segments and/or may be flexible along at least about 20, 40, 60, 80 or 100 percent of the strip.

A strip may be configured such that one or more strips may form a closed shape. A closed shape may refer to a closed two-dimensional shape. For example, two ends of a strip may be attached to form a circle. The strips may be configured such that side edges adhere to each other (e.g., upon application of pressure to join the ends). In other conditions, an additional adhering component may be used to join the ends.

In some instances, strips may be configured such that a containment volume is provided when one or more strips are positioned on a surface. For example, a containment volume could be formed by placing an open cylinder formed by one or more strips on a baking pan. The containment volume may be configured to hold a liquid or viscous liquid, such as a cake batter.

In some instances, a cross section of a strip is substantially rectangular or comprises substantially right angles. In some instances, one or more cross sections of the strip do not comprise a substantially rectangular shape. In some embodiments, a strip may be comprised of a plurality of components or strips. For example, a strip may be composed of a plurality of long components positioned on top of one another.

Strips may be configured to attach to one another, themselves and/or a surface. For example, a first end of a first strip may be configured to attach to an opposite end of the same strip, such that a closed shape can be formed. In one instance, a plurality of strips is attached to each other to form a closed shape. In another example, one or more strips are attached to a side of a pan or container. A strip may attach to itself, another strip and/or a surface due at least in part to the stickiness of the strip. For example, one end of the strip may be pushed against another end of the strip, causing the two ends to stick together. The attachment may be such that one or more strips form a closed shape and such that a cake batter, or other initial food item, positioned inside the shape will not leak the strip/s. Another component may be used to attach a strip end to another strip end or to a surface. For example, a moldable substance, a clay-like substance and/or a sticky substance may be applied to a strip end before contacting the end with another strip end. As another example, a mechanical element such as a Velcro® closure can be used to attach strip ends.

A strip may be configured to be rolled. In some embodiments, a strip can be rolled up without substantial cracking of the strip. In some embodiments, two ends of a strip are attached, such that a closed shape (e.g., a band or ring shape) is formed. In some embodiments, the length of a strip may be dynamically adjusted. For example, a strip may be cut or torn into a plurality of segments.

The strips may have a viscosity similar to a clay or to a Play-doh® modeling compound. In some embodiments, the viscosity is greater than that of a clay or Play-doh® modeling compound. The strips may be formed into shapes (e.g., bent) at substantially room temperature. For example, the strips may be able to bend without cracking temperatures between about 60° F. and about 80° F., between about 65° F. and about 75° F., or at about 70° F.

A strip may be configured such that it can maintain a shape and/or its structural integrity upon exposure to high temperatures, such as temperatures between about 150° F. and about 500° F., about 200° F. and about 400° F., or about 300° F. and about 400° F. In some embodiments, a strip remains flexible at higher temperatures, such as temperatures up to about 100° F., about 200° F., about 300° F., about 400° F., or about 500° F. In other embodiments, a strip hardens at these higher temperatures. In the latter embodiments, the strip may return to its flexible state or remain in its hardened state upon subsequent cooling to room temperature.

A strip may comprise edible and/or non-edible components. In one embodiment, a strip comprises a moldable substance. In one embodiment, a strip comprises an ingredient disclosed herein that may be an ingredient of the moldable substance, such as flour, an oleaginous substance, water, a sugar, a thickener, and/or a fat. The strips may be formed by forming a moldable substance (e.g., by a method disclosed herein) and by forming (e.g., rolling) the moldable substance into a strip. A strip may comprise, for example, one or more of silicon, plastic, and rubber.

In some embodiments, a strip is formed from a dry mix. For example, ingredients (e.g., liquid ingredients or viscous ingredients) may be added to the dry mix. The ingredients to be added may include, for example, oil, water and/or shortening. The mixture may then, in some embodiments, be heated such that the mixture becomes thicker. Once the mixture is the appropriate viscosity, it may be rolled or formed into strips. In some embodiments, a substance of an appropriate viscosity is itself provided and can then be rolled or formed into strips.

Figure 6:
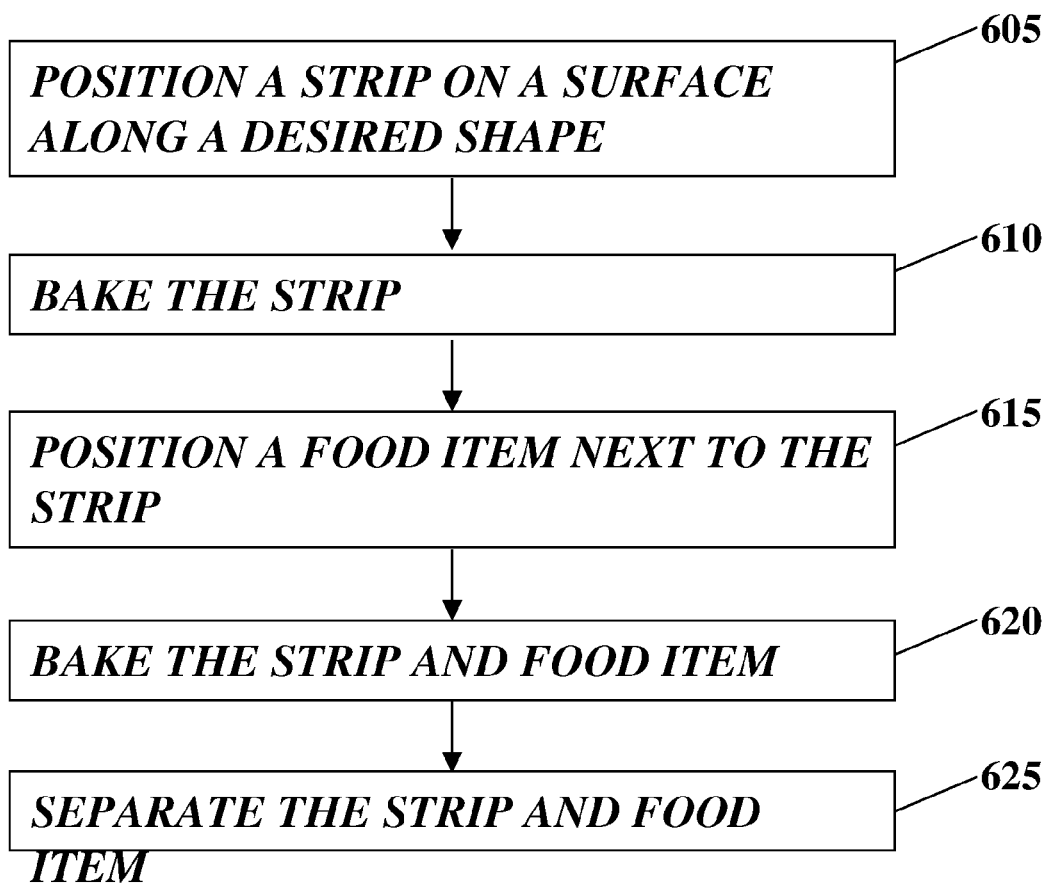
FIG. 6 shows a process for making a food item with a desired shape.

FIG. 6 is a flow diagram illustrating a process 600 for making a food item with a desired shape. Depending on the embodiment, additional steps may be added, others removed, and the ordering of the steps rearranged.

Figure 7A:
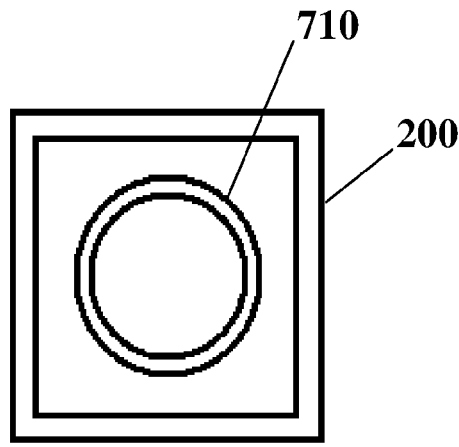
FIGS. 7A-7E show illustrations of making a food item of a desired shape.
Figure 7B:
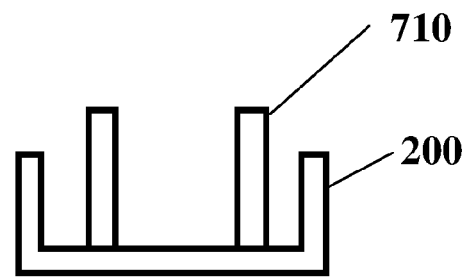

Process 600 begins at step 605 with the positioning a strip 710 on a surface along a desired shape. The desired shape may be outlined on the surface or the strip may be free-formed along the shape. The strip 710 is positioned along an edge of the strip, as shown in FIGS. 7A and 7B, which show top-down and cross-sectional views, respectively, of the strip 710 formed in a shape of a circle. In some instances, more than one strip 710 may be used to form a shape and may be attached together at their ends. The surface may be, for example, the surface of a pan 200. The pan 200 may be lined with, for example, parchment paper and/or may be sprayed with cooking spray.

In some embodiments, the strip 710 is positioned over a bottom layer. The above-described surface may comprise or may be the bottom layer. In some embodiments, the bottom layer is flexible and/or malleable. The bottom layer may have substantially no shape memory. The bottom layer may comprise, for example, a metal (e.g., aluminum, tin, copper, or stainless steel) and/or silicon. In some instances, the strip 710 is formed into a shape and is subsequently positioned over the bottom layer. In other instances, the strip 710 is formed into a shape after being positioned over the bottom layer.

The bottom layer may be at least partly bent around the strip 710. The bottom layer may extend up along part of the strip 710, may extend completely up the side of the strip 710, and/or may extend completely up the side of the strip 710 and wrap around the top of the strip 710. This may inhibit cake batter from leaking out of the desired shape and/or may provide structural support to the strips 710.

Process 600 continues at step 610 with the baking of the strip 710. The strip 710 may be baked for any appropriate time, such as, for example, at least about, about and/or less than about 5, 10, 20 or 30 minutes or about an hour. The strip 710 may be baked at an appropriate temperature, such as, for example, about 300°, 350°, 400°, or 500°. In some embodiments, the baking process hardens the strip 710 such that it is no longer flexible. In some embodiments, step 610 is not part of process 600.

Figure 7C:
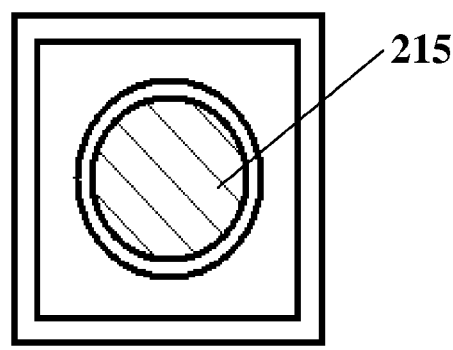
Figure 7D:
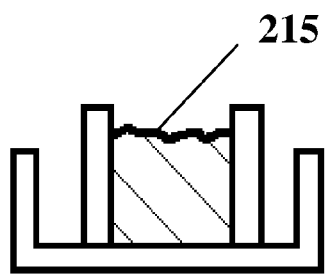

Process 600 continues at step 615 with the positioning of an initial item 215 (e.g., a cake batter) next to the strip 710. FIGS. 7C and 7D show illustrations for which the item 215 is directly next to the strip 710. In instances in which the initial item 215 is a liquid, the one or more strips 710 may contain the initial item 215.

Process 600 continues at step 620 with the baking of the strip 710 and the initial item 215. In some embodiments, process step 620 is replaced by a step of heating, cooling, or freezing the strip 710 and the initial item 215.

Figure 7E:
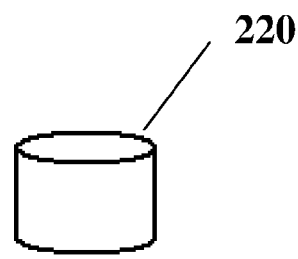

Process 600 continues at step 625 with the separating of the strip 710 and the initial item 215. The strip may be cut and/or each of a plurality of strips may be separated to ease removal of the strip from the item. FIG. 7E shows the resultant item 220, which—in this example—comprises a cake comprising the desired shape of a circle. In some embodiments, the strips are not intended to be eaten after the baking, while in other embodiments, the strips are intended to be eaten after the baking. For example, the strips may be too sweet, dense, salty or acidic to taste good with a cake and/or in large quantities. As another example, the strips may comprise a non-edible component.

In some instances, strips may be baked multiple times, whereas in other embodiments, the strips are only used once. A strip may be baked before a food item is positioned next to the strip (e.g., before a cake batter is poured into a shape formed by the strips), while in other embodiments the strip is not baked prior to the positioning.

In some embodiments, an item (e.g., an ice cream or melted ice cream mixture) may be positioned adjacent to a strip and both the item and the strip may be cooled and/or frozen. The item may be a food item. The strip may be configured such that subsequent to such cooling and/or freezing, the strip is substantially separatable from the cooled and/or frozen item. In some embodiments, the strip is separated from the item by a separation layer, while in other embodiments it is not. The separation layer may be positioned adjacent to the strip before or after the strip has been bent or form in a desired shape. The separation layer may comprise one or more materials material or possess one or more characteristics as described herein.

A strip may be coated with an agent. For example, the strip may be coated with an oil, sprayed with a cooking spray, and/or dusted with flour and/or powdered sugar after the strip has been formed to a desired shape. The coating may aid in the separation between the strip and an item. A strip may be coated with, for example, powdered sugar or cornstarch before a desired shape is formed.

In some embodiments, methods disclosed herein regarding forming walls from a moldable substance may be modified to use strips in place of the formed walls.

Strips may affect a taste or texture of a surface of an item positioned next to the strips. In one embodiment, a cake batter is positioned next to the strips, and the batter and the strips are baked. The strips may impart a flavor into the surface of the cake during the baking.

In some embodiments, forming an item with a particular shape using one or more strips as disclosed herein may provide advantages over forming the shape by cutting an initial item. For example, a cake may be formed into a desired shape using strips. The strips may cause better defined surfaces and/or the surfaces may be less crumbly than would be expected by a surface produced by cutting a cake. Therefore, the surface formed adjacent to the strips may be easier to frost as desired as compared to a cut surface.

The thickness of a strip may be, for example, at least about, about, and/or less than about 5, 3, 2, 1, ½, ¼, ⅛, 1/16, or 1/32 inches. The height of a strip may be, for example, at least about, about, or less than about 16, 8, 6, 4, 3, 2, 1, ½, ¼ or ⅛ inches.

Strips may be provided in a resealable container. In some embodiments, this enables a portion of the strips to be used at a time. In other embodiments, this permits for the strips to be reused.

Moldable substances or flexible strips, such as one described herein, may be used to decorate a cake. The moldable substance may be edible. A moldable substance may be formed into a desired shape and may be placed on, over, next to, or adjacent to a cake. The cake may be frosted or unfrosted. The moldable substance may or may not impart a color onto the cake and/or frosting. The moldable substance may be configured to be easily repositioned on a cake. The moldable substance may comprise a color and/or may comprise a flavor, such as an artificial or natural flavor.

The moldable substance may be formed into a desired shape using molds, such as candy molds. The mold may comprise a single sheet with one or more indentations. In this instance, the moldable substance may be pressed into the indentation to take on the shape of the indentation. The mold may comprise two sheets with one or more indentations. The moldable substance may be positioned between the two sheets or on or over one of the sheets and the sheets may be pressed together. The substance may then be characterized by shapes defined by the indentations on each of the sheets. The two sheets may be connected by, for example, a hinge.

A design may be imprinted into a moldable substance by pressing an object into the moldable substance. The object may comprise a rigid surface, with extruding features. The object may then be removed from the moldable substance, such that the substance has indentations corresponding to extruding features or the object.

A moldable substance may be pushed through a device in order to form a decorated shape. For example, a moldable substance may be loaded into a tube and may be pushed out through the tube, through a designed object. The designed object may include a flat surface with slit- or shaped-openings. The moldable substance may thereby be formed into a decorative strip, string, or line.

A moldable, edible substance may be used with a device described in U.S. Pat. Nos. 5,409,364, 5,104,347, 2,578,105, 3,264,685, 3,590,749, 3,685,936, 3,741,706, 4,076,476, 4,569,815, 4,623,319, 6,602,066, 7,275,924, and/or 4,815,961, all of which are incorporated by reference in their entireties.

A moldable, edible substance may be used with a product marketed by Play-Doh®, such as a mold, extruder, or cutter.

In some embodiments, the same moldable substance may be used to at least partly control a shape of a baked item comprising a particular shape as is used to decorate a cake. This may mean that a first portion of the substance is used to at least partly control the shape of the baked item and a second portion to decorate a cake. In other embodiments, the moldable substance used to decorate a cake is not or is distinct from one that can at least partly control the shape of the baked item. In some embodiments, a moldable substance used to decorate a cake can be converted into a moldable substance to decorate a cake or the converse. For example, colorings or flavorants may be added. The texture may also be changed by adding, for example, additional fats, oils, water, powdered food substance, sugar, and/or powdered sugar. In one instance, a moldable substance used to at least partly control a shape of a baked item may be converted into a moldable substance to decorate a cake by adding additional powdered sugar to the substance.

In some embodiments, information may be provided (e.g., concomitantly provided) with a moldable substance, with a strip, or with a mix or intermediate product to make the moldable substance and/or strip. The information can be associated with the container, for example, by being: written on a label adhesively affixed to a container comprising a moldable substance described herein; included inside a container as a written package insert, such as inside a box which contains packets of the moldable substance; applied directly to the container such as being printed on the wall of a box; or attached as by being tied or taped, for example as an instructional card affixed to the neck of a bottle via a string, cord or other line, lanyard or tether type device.

The information may indicate a process step or a characteristic associated with a moldable substance or a strip. For example, the information may indicate that the moldable substance strip is bendable, moldable and/or edible. The information may indicate that an object may be used to form a shape within the moldable substance. For example, a tool may be used to form an impression within the substance or an object may be pressed into the substance to form an impression. The information may indicate that a batter and/or food item may be positioned at a location, poured onto a location, and/or spread onto a location relative to the moldable substance or the strip. The information may indicate that the moldable substance or the strip may be positioned within a container, and/or that the container may be coated with a coating substance, such as a fat, an oil, a cooking spray, or a flour. The information may indicate that the strip may be formed into a closed shape. The information may indicate that the moldable substance may be baked and/or exposed to high temperatures. The information may indicate that the moldable substance or the strip is configured to be substantially separatable from a food item subsequent to the baking of the food item adjacent to the moldable substance or the strip. The information may indicate a handling of the moldable substance or the strip. For example, the information may indicate that the moldable substance should be warmed before forming a shape with the substance. The information may indicate that the moldable substance or strip should be baked after forming a shape with the substance or strip.

The information may indicate an objective of the moldable substance or strip. For example, the information may indicate that a shape of the moldable substance or strip may at least partially determine the shape of a food item (e.g., a baked item). The information may indicate that the moldable substance or strip may be used while baking a food item, such as a cake, bar cookies, brownies, cupcakes, cookies, a pie, muffins, or a bread.

The information may indicate an ingredient of the moldable substance or strip. For example, the information may indicate that an ingredient of the moldable substance or strip is cocoa butter, a nut butter, milk fat, canola oil, corn oil, a nut oil, soybean oil, hydrogenated vegetable oil, sugar, flour, or a flavoring.

The information may indicate an additional step that may be performed to produce a desired result. For example, the information may indicate that one or more materials should be added to a mix to produce a moldable substance or a strip. The information may indicate that the moldable substance or strip may be covered by a separation layer (e.g., aluminum foil) or coated with a substance (e.g., a cooking spray).

The information may indicate instructions for baking a cake using the moldable substance or strip. For example, the information may indicate that the moldable substance and/or one or more strips may be formed into a desired shape, a cake batter may be positioned within or over the formed shape, and the batter and the formed moldable substance may be baked.

The information may indicate instructions for modifying a recipe while using the moldable substance or strip. For example, the information may indicate that the baking time should be increased, that a baking temperature should be changed, and/or that an amount of a fat (e.g., an oil) or a liquid used in the recipe should be changed. The information may indicate further instructions, such as a cooling time after baking, after which the moldable substance may be separated from a food item or a technique for separating the moldable substance from a food item.

The information may indicate that the moldable substance may be used to decorate a food item. For example, the moldable substance may be formed into shapes to be placed on top of a cake. In some embodiments, the moldable substance may be positioned with respect to a food item after the food item has undergone a cooking step, such as baking or freezing and the information may indicate accordingly.

The information may indicate that the moldable substance may be used and/or served with a food item. For example, the moldable substance may be used to form a two-dimensional shape, wherein the moldable substance provides walls to contain a food item. After the food item (e.g., ice cream) undergoes a cooking process, the moldable substance may be served with the food item.

The information may indicate that the moldable substance or strip should be heated or cooled. For example, the information may indicate that the moldable substance should be heated prior to molding. The information may indicate that the moldable substance should be coated or that a user should coat their hands, containers, and/or cooking utensils. For example, the information may indicate that the moldable substance should be coated with a sugar or cornstarch prior to molding.

In some embodiments, additional instruments may be provided to use with the moldable substance or strip. An instrument may be provided to smooth a moldable substance after a desired shape has been formed. An instrument may be provided to produce rounded edges in the moldable substance. An instrument may be provided to cut the moldable substance or strip (before or after, for example, baking).

Tools for forming specific shapes may accompany the objects. For example, an impression tool may be used to press a specific design into the moldable substance. A food item may subsequently be formed over the moldable substance, such that the resultant item may have the design "pop out" of the top of the item. A cutting tool of a particular shape may be used to form a boundary of a design within the moldable substance. In some embodiments, the moldable substance outside of the boundary is removed. A food item may subsequently be formed over the moldable substance inside the boundary, such that the resultant item may have a feature defined by the shape of the boundary indented into the item. In some embodiments, the moldable substance inside the boundary is removed. A food item may subsequently be formed over the moldable substance inside the boundary, such that the resultant item may either be of the shape formed by the boundary of have a feature defined by the shape of the boundary protrude from the item. An adhesion tool may be used to connect or help connect a plurality of strip ends. For example, the adhesion tool may comprise a paste that can be applied to a first strip end, such that a second strip end will attach to the first strip end after contacting the applied paste. In some embodiments, bending-enabling tools (e.g., a hinge, fastener and/or clamp) are provided. For example, if the strips are rigid or have limited flexibility, a plurality of strip ends may connect to a hinge, such that a shape formed by the strip comprises a corner or bend at the location of the bending-enabling tool. The tools may be nonstick. The tools may comprise a plastic. The tools may comprise a metal. Information provided with the moldable substance may indicate that it may be used with one or more tools and/or accessories, such as a Play-Doh® product.

The moldable substance or strip may be provided with a cooking container. For example, the moldable substance may be provided with or in a cake pan or sheet pan. The cooking container may be disposable. The moldable substance may be pre-formed. For example, the moldable substance may be positioned within a cake pan and formed into a shape such that food item baked within the pan will form into a desired shape.

In some embodiments, outline drawings are provided with a moldable substance or strip. The outline drawings may be provided on, for example, paper, parchment paper, or wax paper. In some embodiments, the outline drawings are provided on a material that can withstand high temperatures. The outline drawings may include a shape. For example, the outline drawing may include lines of a thickness along which strips as described herein may be positioned. In some instances, "walls" are formed out of a moldable substance along lines in the drawing. In these instances, cake batter may be poured inside the strips or moldable substance and a resulting cake may have the shape from the drawing. In some embodiments, the outline drawings are provided with strips such as one from an embodiment described herein and/or a moldable substance such as one from an embodiment described herein. A kit may include the outline drawings, instructions to use the outline drawings with a food item (such as a cake batter), a strip such as one from an embodiment described herein and/or a moldable substance such as one from an embodiment described herein.

In some embodiments, a computer program or a computer readable medium may be used to make the outline drawing. For example, a computer program or a computer readable medium may be used such that the outline drawing may be printed. The drawing may be printed on paper or another material. In one instance, the drawing may be printed on parchment paper. The parchment paper may be in a standard paper size, such as 8½×11-inches or may be larger to fit into a standard pan (e.g., 13×9-inches or 13×18-inches). The program or computer readable medium may comprise an input selection component. The input selection component may be configured to display selection options, including selections among a plurality of drawings, drawing sizes, numbers of servings, and/or pan sizes. For example, a number of pan sizes and a number of drawings may be shown to a user. The input selection component may be configured to receive user input. For example, the user may identify one drawing and one pan size. The input selection may also be configured to allow a user to import or upload a drawing. In some instances, the uploaded drawing may be available to other users via a network.

The program or computer readable medium may comprise an image-modifying component. The image-modifying component may, for example, be configured to smooth the lines of the drawing, delete shading from the drawing and/or increase contrast of the drawing. In some instances, the image-modifying component allows the user to draw a drawing. The image-modifying component may also be configured to extract an outline from an image or picture. For example, the image-modifying component may be configured to identify borders by analyzing image contrast.

The program or computer readable medium may comprise a resealing component. The resealing component may be configured to rescale a drawing (e.g., a user-selected drawing) based on a pan size, a drawing size and/or a number of servings. In some instances, the width and height of the image are rescaled by equal amounts, while in other instances, the image is skewed. The thickness of lines of the rescaled drawing may be, for example, at least about, about, and/or less than about ⅟32, ⅟16, ⅛, ¼, ½ or 1 inch. In some instances, the resealing component is configured such that the thickness of the lines does not change proportionally as the drawing is rescaled. In some instances, the thickness of the lines does not change as the drawing is rescaled.

The program or computer readable medium may comprise an output component. The output component may be configured to provide a file to be stored and/or printed, wherein the file comprises the rescaled image. For example, the output component may be configured to provide a document in a portable document format or in an image format. The document may be provided to be downloaded from a network. The document may be provided to be printed on a single page or on a plurality of pages. For example, a drawing may be printed on 4 sheets of printable material, which may then be positioned relative to each other such that the combined sheets show the complete drawing. In some instances, the document may be configured to be printed on paper, while in others it may be configured to be printed on another material, such as wax paper. A portion or all of an image on the printed document may be traced onto other materials (e.g., tracing an outline from one or more sheets of regular paper to that of wax paper).

The program or computer readable medium may be available online or on a network. A computer implemented system may include a computing environment, storage in data communication with the computing environment and configured to store original, modified and/or rescaled drawings, and the program or computer readable medium, wherein the program or computer readable medium operates on the computing environment.

EXAMPLES

Example 1

The oven was preheated to 350° F. An 8-inch round glass pan was sprayed with canola oil cooking spray. A moldable, edible substance was prepared by combining 3½ cups of creamy peanut butter with 4 cups of powdered sugar. A portion of the peanut butter mixture was evenly pressed into the prepared pan, such that the mixture was approximately 1.5 cm tall. A hand was pushed into the peanut butter mixture to form a hand-shaped indentation. The peanut butter mixture was sprayed with canola oil cooking spray.

A cake batter was prepared by beating together 1 (18.25-oz) Duncan Hines® Butter Yellow cake mix, 1¼ cups water, ½ cup canola oil, and 3 eggs. A portion of the cake batter was poured over the peanut butter mixture, filling about ⅔ of the pan.

The cake was baked until a fork inserted into the center of the cake could be cleanly removed. The cake was inverted onto another pan. The baked peanut butter mixture was flaked off of the cake. The resultant cake was characterized by an 8-inch round base with a hand shape protruding from the top of the cake.

Example 2

The oven was preheated to 350° F. A 9-inch square glass pan was sprayed with canola oil cooking spray. A moldable, edible substance was prepared by combining 1¾ cups of vegetable shortening with 6 cups of powdered sugar. A portion of the resulting shortening mixture was evenly pressed into the prepared pan, such that the mixture was approximately 1.5 cm tall. The number '6' was indented into the shortening mixture.

A cake batter was prepared by beating together 1 (18.25-oz) Duncan Hines® Butter Yellow cake mix, ¼ cups water, ½ cup canola oil, and 3 eggs. A portion of the cake batter was poured over the shortening mixture, filling approximately ⅔ of the pan.

The cake was baked until a fork inserted into the center of the cake could be cleanly removed. The cake was inverted onto another pan. The shortening mixture remained in the 9-inch pan upon inversion. The shortening mixture was subsequently easily removed from the 9-inch pan. The resultant cake was characterized by a 9-inch square base with the number '6' protruding from the top of the cake.

Example 3

The oven was preheated to 350° F. A 4-inch round metal pan was sprayed with canola oil cooking spray. A moldable substance was prepared by mixing 2 cups of flour with 1 cup of salt, 2 tablespoons of canola oil, and 1 cup of cold water. A portion of the resulting flour mixture was evenly pressed into the prepared pan, such that the mixture was approximately 1.5 cm tall. A heart was indented into the flour mixture. A piece of aluminum foil was positioned over the flour mixture and formed to the shape of the flour mixture. The aluminum foil was sprayed with canola oil cooking spray.

A cake batter was prepared by beating together 1 (18.25-oz) Pillsbury® Moist Supreme classic yellow cake mix, 1 cup water, ⅓ cup canola oil, and 3 eggs. A portion of the cake batter was poured over the aluminum-covered flour mixture, filling approximately ⅔ of the pan.

The cake was baked until a fork inserted into the center of the cake could be cleanly removed. The cake was inverted onto another pan. By pulling the aluminum foil upwards, the flour mixture was separated from the cake. The resultant cake was characterized by a 4-inch round base with a heart protruding from the top of the cake.

Example 4

The oven was preheated to 350° F. A rectangular metal cookie sheet was sprayed with canola oil cooking spray. A moldable, edible substance was prepared by combining 2¼ cups of vegetable shortening with 10 cups of powdered sugar and 3 tablespoons of canola oil. A portion of the shortening mixture was pressed into a middle portion of the prepared pan. A dinosaur shape was cut out from the center of the mixture. The remaining mixture was formed such that the mixture bordering the dinosaur shape comprised substantially straight vertical walls approximately 2 inches tall.

A cake batter was prepared by beating together 1 (18.25-oz) Duncan Hines® White cake mix, ¼ cups water, ⅓ cup canola oil, and 3 eggs. A portion of the cake batter was poured into the dinosaur-shaped cavity, such that the batter rose to be approximately ⅔ the height of the walls formed by the shortening mixture.

The cake was baked until a fork inserted into the center of the cake could be cleanly removed. The shortening mixture was cut into pieces and removed from the cookie sheet. The resultant cake comprised a dinosaur shape and was easily removed from the cookie sheet. The resultant cake was easily frosted, such that few crumbs flaked off of the cake into the frosting during the frosting process.

Example 5

A round 5-inch cake pan was sprayed with canola oil cooking spray. A moldable, edible substance was prepared by combining 2¼ cups of vegetable shortening with 10 cups of powdered sugar and 3 tablespoons of canola oil. A portion of the resulting shortening mixture was pressed into the bottom of the prepared pan. A center circular portion of the mixture was removed. Softened chocolate ice cream was poured into the pan. The pan was placed in the freezer for three hours.

A knife was used to separate the ice cream from the sides of the cake pan. The pan was inverted. The ice cream and the frozen shortening mixture were easily removed from the pan. Using a knife, the frozen shortening mixture was easily removed from the ice cream. The ice cream comprised a bottom circular shape supporting a smaller, top circular shape.

Example 6

A rectangular cake pan was sprayed with canola oil cooking spray. A moldable, edible substance was prepared by combining 2¼ cups of vegetable shortening with 10 cups of powdered sugar and 3 tablespoons of canola oil. A portion of the resulting shortening mixture was pressed into the bottom of the prepared pan. A lightening bolt-shaped portion of the mixture was removed.

A 3-ounce package of raspberry Jell-O was combined with ¾ cup of boiling water. Next, ½ cup of drained, crushed pineapple, ½ cup fat-free sour cream, and ½ cup fat-free cream cheese were mixed into the gelatin mixture. The gelatin mixture was poured inside the lightening bolt-shaped cavity.

The gelatin mixture was cooled in a refrigerator for four hours. The shortening mixture easily separated from the gelatin mixture, and the resultant gelatin mixture was in a lightening bolt shape.

Example 7

A 13×9-inch cake pan was sprayed with canola oil cooking spray. A moldable, edible substance was prepared by combining 2½ cups of vegetable shortening with 2 pounds of powdered sugar. A portion of the resulting shortening mixture was pressed into the bottom of the prepared pan. A sheet of plastic wrap was positioned over the shortening mixture. Tools (including a hammer, a tape measurer and a screw driver) were positioned on the plastic wrap and were pressed into the shortening mixture to form impressions in the shortening mixture. The tools and the plastic wrap were removed from the pan. Impressions of the tools were formed in the shortening mixture. A cake batter was poured into the pan and was baked until the cake was done. A knife was used to separate the cake from the sides of the pan, and the pan was inverted. The cake came out of the pan, and tool shapes "popped out" of the cake. The shortening mixture remained in the pan but was easily removed using a knife and spatula.

Example 8

A moldable, edible substance was prepared by combining 2½ cups of vegetable shortening with 2 pounds of powdered sugar, in a large mixer. Approximately 5 cups of a clay-like moldable substance resulted.

Example 9

A portion of the moldable substance from Example 8 was pressed into a 4-inch round pan. A heart indentation was formed in the moldable substance in the center of the pan. The heart indentation was coated with a red gel food dye. A yellow cake batter was poured over the shortening mixture and was baked until the cake was done. A knife was used to separate the cake from the edges of the pan, and the cake was inverted. A heart shape "popped out" of the cake, and the heart was red.

Example 10

A moldable, edible substance was formed by combining 350 grams of un-hydrogenated Spectrum® organic shortening with 1 pound of powdered sugar. An additional pound of powdered sugar was then added to the shortening mixture. 5 tablespoons of canola oil were gradually added to the shortening mixture.

Example 11

A moldable, edible substance was formed by combining 350 grams of vegetable shortening with 2 pounds of powdered sugar. 2 tablespoons of canola oil were gradually added to the shortening mixture. The moldable, edible substance was separated into portions, and a gel food dye was added to each portion until the desired color was obtained. Approximately 250 additional grams of powdered sugar were added to the moldable substance. If the substance was found to stick to plastic surfaces, additional powdered sugar was added to the shortening mixture until the substance no longer stuck to the plastic surfaces.

The moldable, edible substance was formed into a candle shape using a plastic candle mold from a Play-Doh® Birthday Set Bucket. The mold included two plastic plates, connected with a hinge, each with an indention of a candle shape. The substance was positioned between the plates, the plates were pushed together, and the substance took on the shape of the candle.

The moldable, edible substance was formed into decorating strips using an extruder/plunger from a Play-Doh® Birthday Set Bucket. The substance was pushed into the plunger, which comprised a plastic tube with a hole on each end. The hole on one end was positioned next to a plastic sheet with a design cut out. For example, the design could include a star-like shape, or a cross shape. A plunger was inserted into the other side of the tube, and acted to push the moldable substance through the extruder through the designed sheet. A decorated strip of the moldable substance resulted.

The moldable, edible substance was imprinted using a dog-shaped imprint from a Play-Doh® Super Craft Caddy set. The imprint was pressed into the substance and then carefully removed. The substance then included indentations consistent with those from the imprint, in the outline of a dog shape.

The imprint, strips, and candles were positioned on top of a frosted cake. The imprint, strips, and candles functioned to decorate the cake. The imprint, strips, and candles could be easily moved around the top of the cake, with little or no transfer of color from the imprint, strips, or candles onto the frosting on the cake.

Example 12

A moldable, edible substance is formed comprising the following ingredients:

| Ingredients | Percent |
| --- | --- |
| Sodium Chloride | 5.79 |
| Calcium Chloride | 5.79 |
| Aluminum Sulfate | .71 |
| 10 Mol Borax | .51 |
| Sodium Benzoate | .2 |
| Wheat Flour | 32.99 |
| Waxy Maize Starch | 4.82 |
| PEG 1500 Monostearate | .51 |
| Mineral Oil | 2.92 |
| Water | 45.67 |
| Vanilla Fragrance | .10 |

Example 13

A moldable, edible substance is formed comprising the following ingredients:

| Ingredients | Percent |
| --- | --- |
| Sodium Chloride | 6.16 |
| Calcium Chloride | 6.16 |

-continued

| Ingredients | Percent |
| --- | --- |
| Aluminum Sulfate | .27 |
| Potassium Dihydrogen Phosphate | .15 |
| Sodium Benzoate | .22 |
| Wheat Flour | 32.34 |
| Waxy Maize Starch | 5.88 |
| PEG 1500 Monostearate | .54 |
| Mineral Oil | 3.10 |
| Water | 45.08 |
| Vanilla Fragrance | .11 |

Example 14

A moldable, edible substance is formed comprising the following ingredients:

| Ingredients | Percent |
| --- | --- |
| Sodium Chloride | 5.63 |
| Calcium Chloride | 5.63 |
| Aluminum Sulfate | .69 |
| 10 MOL Borax | .44 |
| Sodium Benzoate | .20 |
| Wheat Flour | 33.34 |
| Waxy Maize Starch | 6.17 |
| PEG 1500 Monostearate | .49 |
| Mineral Oil | 2.84 |
| Water | 44.46 |
| Vanilla Fragrance | .10 |

Example 15

A moldable, edible substance is formed comprising the following ingredients:

| Ingredients | Percent |
| --- | --- |
| Sodium Chloride | 5.79 |
| Calcium Chloride | 5.79 |
| Aluminum Sulfate | .71 |
| 10 MOL Borax | .51 |
| Sodium Benzoate | .20 |
| Flour | 32.99 |
| Waxy Maize Starch | 4.82 |
| Surfactant* | .51 |
| Mineral Oil | 2.92 |
| Water | 45.67 |
| Vanilla Fragrance | .10 |

*Surfactant can be Tween ®60, PEG 400 monolaurate, PEG 1750 monostearate, PEG 600 monolaurate, PEG 150 distearate, or combinations thereof.

Example 16

Any of the substances described in Examples 11-14 may be prepared according to the following procedure:
1. All of the dry ingredients (e.g., the salt, starch-based binder, preservative, hardener, and retrogradation inhibitor) are added to a mixer, such as an FKM series batch mixer.
2. The mixer is turned on and set on a speed of 30 rpm.
3. After 2 minutes, mineral oil is added to the mixture.
4. After 30 seconds, PEG 1500 monostearate (or other surfactant(s)) and fragrance are added to the mixture.
5. Add water, preheated to a temperature of about 170° F. (about 77° C.), to the mixture.
6. Mix for an additional 5 minutes.
7. Discharge the fully compounded modeling compound from the mixer.

Example 17

Play-doh® modeling compound was pressed into the bottom of a baking pan. Cake batter was poured over the modeling compound. The cake batter and modeling compound were baked. A knife was used to separate the modeling compound from the sides of the pan. The pan was inverted. Most of the cake separated from the baked modeling compound. The baked modeling compound was easily removed from the pan.

Example 18

A moldable, edible substance was formed by combining 350 grams of vegetable shortening with 3 pounds of powdered sugar. 5 tablespoons of canola oil were gradually added to the shortening mixture. The substance could be molded using plastic molds without sticking to the molds.

Example 19

A moldable substance was formed by combining 1 cup of salt, 2 cups of flour, 3 tablespoons cream of tartar, two tablespoons canola oil, and 2 cups of water. The mixture was heated in a microwave for 3 minutes, stirred, heated for an additional 3 minutes, stirred, heated for an additional minute, stirred, and heated for an additional minute. The resulting mixture had a clay-like flexibility. The mixture was rolled into a thin strip approximately 28 inches long, approximately 3 inches tall, and approximately ¾ inches thick. The strip was formed into a circle on a baking sheet pan, pinching the two short ends of the strip together to form a circle. The strip was baked at 350 degrees for 10 minutes. The baked strip was sprayed with canola oil cooking spray. Cake batter was poured inside the circle formed by the strip, and the strip and batter were baked until the cake was done. After cooling, the strip was cut into segments and separated from the cake. The cake and strips easily separated, and the resulting cake had a circular shape, similar to that formed by the strip initially.

Example 20

A dry mix was formed by combining 562 g flour, 200 g sugar, 13 g cinnamon, 11 g cornstarch, 5 g salt, 1.7 g tartaric acid, and 1.3 g alum. The dry mix was stirred with 944 g water and 112 g oil in a microwave-safe bowl for 1 minute. The mixture was heated in the microwave for 12 minutes, stirring every 4 minutes. The mixture was rolled out on a metal surface to be ½-inch to ¾-inch thick and was cut into strips that were 3 inches wide.

A computerized program was used to select an outline shape. Input parameters were chosen. Specifically, the cake shape was chosen to be a bunny, and the pan size was chosen to be 13×18-inches. The program then output a 4-page document with the bunny shape spanning the pages. The pages were printed and connected together to form a bunny shape. A piece of parchment paper was positioned over the combined pages, and the shape was traced onto the paper. The parchment paper was cut to be 13×18 inches and was positioned on the bottom of a 13×18-inch sheet pan.

The strips were then bent into position over the parchment paper and bent around the shape on the wax paper. Ends of the strips were pressed together with ends of adjacent strips to form a closed shape, and the bottom edges were pressed down into the bottom of the pan. Additional parts of the strips were torn to be used for support where needed. The strips were baked at 350 degrees for 10 minutes. The parchment paper, pan, and strips were coated with cooking spray. Cake batter was poured inside the strips and was baked until the cake was done. The strips were cut into segments and separated from the final cake. The perimeter of the cake was a bunny shape, similar to that on the wax paper.

Example 21

Four groups of vertical supports were provided. Each group contained approximately 65 adjacent supports and the length and height of the group were about 8½ and 3 inches, respectively. Each support was about 3 inches long and about ⅛ inch in diameter. The supports were connected to each other on top by a string that wrapped around each support, and the supports were connected on bottom in a similar manner. A thin sheet of aluminum was obtained, which was approximately 36×10 inches, with a thickness of about 0.01 cm. The groups of supports were placed end to end. The aluminum was wrapped around the supports to fully encase them. Thus, a flexible aluminum-covered strip was formed.

A large sheet of aluminum foil was placed on a baking pan. The strip was stood on its ends and positioned around the shape of a hammer on top of the foil. The ends of the strip were connected by folding the aluminum from one end over the other end of the strip. The foil was then folded up around the strip. The foil and strip were sprayed with cooking spray and cake batter was poured inside the shape formed by the strip. The cake was baked until done. The strip was separated from the cake, and the shape of the cake's perimeter was that of a hammer.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. The scope of the invention is indicated by the appended claims rather than by the foregoing description. All changes that come within the meaning and range of equivalency of the claims are to be embraced within their scope.

What is claimed is:

1. A method for baking a cake, comprising:
    forming a depressed indentation into a moldable substance, the moldable substance being moldable in that:
        the substance has a low viscosity such that the substance is soft and flexible, and
        the moldable substance is capable of being shaped, in a reversible manner, into a shape and subsequently maintaining the shape;
    positioning cake batter at a selected location relative to the moldable substance;
    baking the cake batter and the moldable substance; and
    separating the baked cake batter from the baked moldable substance,
    wherein the baked cake batter separated from the baked moldable substance comprises a shape substantially similar to the indentation or substantially complementary to the indentation, and
    wherein the moldable substance continues to be moldable when the cake batter is positioned at the selected location.

2. The method of claim 1, wherein the positioning the cake batter comprises positioning the cake batter on the moldable substance.

3. The method of claim 1, wherein the moldable substance imparts a flavor into a surface of the baked cake batter during baking.

4. The method of claim 1, the method further comprising coating the moldable substance with a coating substance after forming the depressed indentation and before positioning the cake batter.

5. The method of claim 1, wherein the moldable substance imparts a color onto a surface of the baked cake batter during baking.

6. The method of claim 1, the method further comprising positioning a separation layer on the moldable substance after the forming the depressed indentation and before positioning the cake batter.

7. The method of claim 1, wherein separating the baked cake batter from the baked moldable substance comprises inverting the baked cake batter and the baked moldable substance.

* * * * *